(12) United States Patent
Ito

(10) Patent No.: US 8,718,058 B2
(45) Date of Patent: May 6, 2014

(54) DEVICE SEARCH APPARATUS AND METHOD, AND DEVICE SEARCH SERVER, DEVICE SEARCH SYSTEM, AND STORAGE MEDIUM

(75) Inventor: Yuki Ito, Kawasaki (JP)

(73) Assignee: Canon Kabushiki Kaisha (JP)

( * ) Notice: Subject to any disclaimer, the term of this patent is extended or adjusted under 35 U.S.C. 154(b) by 492 days.

(21) Appl. No.: 12/985,647

(22) Filed: Jan. 6, 2011

(65) Prior Publication Data

US 2011/0164615 A1 Jul. 7, 2011

(30) Foreign Application Priority Data

Jan. 6, 2010 (JP) ................................. 2010-001155

(51) Int. Cl.
*H04L 12/28* (2006.01)
*H04L 12/56* (2011.01)
*G06F 15/16* (2006.01)
*G06F 15/173* (2006.01)
*G06F 7/00* (2006.01)

(52) U.S. Cl.
USPC ............ 370/390; 709/203; 709/223; 707/769

(58) Field of Classification Search
USPC .............. 370/312, 310.2, 389, 390, 392, 432; 709/220, 223, 226, 203; 707/769
See application file for complete search history.

(56) References Cited

U.S. PATENT DOCUMENTS

| | | | | |
|---|---|---|---|---|
| 8,239,376 B2 * | 8/2012 | Fesen | ............................ | 707/722 |
| 2003/0097425 A1 * | 5/2003 | Chen | ............................ | 709/220 |
| 2006/0168264 A1 * | 7/2006 | Baba et al. | ...................... | 709/230 |
| 2006/0184693 A1 * | 8/2006 | Rao et al. | ........................ | 709/245 |
| 2006/0239190 A1 * | 10/2006 | Kumar et al. | ................. | 370/230 |
| 2006/0242322 A1 * | 10/2006 | Williams et al. | ............... | 709/245 |
| 2006/0291434 A1 * | 12/2006 | Gu et al. | ......................... | 370/338 |
| 2007/0076250 A1 | 4/2007 | Kudo | | |
| 2007/0250590 A1 * | 10/2007 | Flannery et al. | ............... | 709/217 |
| 2008/0168440 A1 * | 7/2008 | Regnier et al. | ................. | 718/100 |
| 2008/0294718 A1 * | 11/2008 | Okano | ........................... | 709/203 |
| 2009/0122722 A1 * | 5/2009 | Lin et al. | ........................ | 370/254 |
| 2009/0210530 A1 * | 8/2009 | Modi | ............................ | 709/226 |
| 2009/0327496 A1 * | 12/2009 | Klemets et al. | ............... | 709/227 |
| 2010/0131582 A1 * | 5/2010 | Driscoll et al. | ............... | 709/202 |
| 2010/0182438 A1 * | 7/2010 | Mohammed | ............. | 348/207.11 |

FOREIGN PATENT DOCUMENTS

| | | |
|---|---|---|
| JP | 2003-093341 A | 4/2003 |
| JP | 2007-097057 A | 4/2007 |
| JP | 2009-284410 A | 12/2009 |

* cited by examiner

*Primary Examiner* — Ayaz Sheikh
*Assistant Examiner* — Hoang-Chuong Vu
(74) *Attorney, Agent, or Firm* — Rossi, Kimms & McDowell LLP

(57) ABSTRACT

A device search apparatus able to easily search for and find a device on a different subnet in a network environment where a plurality of subnets are connected together by routers. A client PC as a device search apparatus transmits by multicast a Probe message in which a value representing a search server is set, and extracts from a message received from the search server a URL of a search server on another subnet other than a network to which the client PC is connected. The client PC transmits by unicast, based on the URL of the search server, to the search server on the other subnet a message in which a device type to be searched is set, and extracts from a message received from the search server a URL of a device on the other subnet.

9 Claims, 32 Drawing Sheets

FIG.8

| ID 801 | UUID 802 | VERSION 803 | DEVICE TYPE 804 | MODEL NAME 805 | DEVICE NAME 806 | URL 807 | IP ADDRESS 808 |
|---|---|---|---|---|---|---|---|
| 1 | 123456 | 1 | Printer | LBPXXXX | Dev Printer | http://192.168.0.1/wsd/mex | 192.168.0.1 |
| 2 | ghijkl | 1 | DiscoveryProxy | DPXXXX | DP SERVER 105 | http://192.168.1.2/wsd/mex | 192.168.1.2 |
| 3 | mnopqr | 1 | DiscoveryProxy | DPXXXX | DP SERVER 107 | http://192.168.2.2/wsd/mex | 192.168.2.2 |

```
<Envelope>
  <Header>
    <Action>Hello</Action>
    <MessageID>1</MessageID>                           } 901
    <To>urn:discovery</To>
  </Header>
  <Body>
    <Hello>
      <EndpointReference>
        <Address>urn:uuid:234567</Address>
      </EndpointReference>
      <Types>Printer</Types>                           } 902
      <XAddrs>http://192.168.1.1/wsd/mex</XAddrs>
      <MetadataVersion>1</MetadataVersion>
    </Hello>
  </Body>
</Envelope>
```

FIG.10

```
<Envelope>
 <Header>
  <Action>GetResponse</Action>
  <MessageID>1</MessageID>
  <To>anonymous</To>
 </Header>
 <Body>
  <Metadata>
    <MetadataSection>
     <ThisDevice>
       <FriendlyName>Sales Printer</FriendlyName>
       <FirmwareVersion>1.00</FirmwareVersion>          } 1101
       <SerialNumber>2222</SerialNumber>
     </ThisDevice>
    </MetadataSection>
    <MetadataSection>
     <ThisModel>
       <Manufacturer>Canon</Manufacturer>
       <ManufacturerUrl>http://www.canon.com</ManufacturerUrl>
       <PresentationUrl>http://192.168.1.1</PresentationUrl>  } 1102
       <ModelName>LBPYYYY</ModelName>
     </ThisModel>
    </MetadataSection>
    <MetadataSection>
     <Relationship>
       <Hosted>
        <EndpointReference>
          <Address>http://192.168.1.1/wsd/print</Address>
        </EndpointReference>                             } 1103
        <Types>PrinterServiceType</Types>
        <ServiceId>uri:234567</ServiceId>
       </Hosted>
     </Relationship>
    </MetadataSection>
  </Metadata>
 </Body>
</Envelope>
```

FIG.11A

```
<Envelope>
  <Header>
    <Action>Probe</Action>
    <MessageID>1</MessageID>
    <To>urn:discovery</To>
  </Header>
  <Body>
    <Probe>
      <Types>DiscoveryProxy</Types>
    </Probe>
  </Body>
</Envelope>
```

FIG.11B

```
<Envelope>
  <Header>
    <Action>ProbeMatch</Action>
    <MessageID>1</MessageID>
    <To>anonymous</To>
  </Header>
  <Body>
    <ProbeMatches>
      <ProbeMatch>
        <EndpointReference>
          <Address>urn:uuid:abcdef</Address>
        </EndpointReference>
        <Types>DiscoveryProxy</Types>
        <XAddrs>http://192.168.0.2/wsd/mex</XAddrs>
        <MetadataVersion>1</MetadataVersion>
      </ProbeMatch>                                          }1401
      <ProbeMatch>
        <EndpointReference>
          <Address>urn:uuid:ghijkl</Address>
        </EndpointReference>
        <Types>DiscoveryProxy</Types>
        <XAddrs>http://192.168.1.2/wsd/mex</XAddrs>
        <MetadataVersion>1</MetadataVersion>
      </ProbeMatch>                                          }1402
      <ProbeMatch>
        <EndpointReference>
          <Address>urn:uuid:mnopqr</Address>
        </EndpointReference>
        <Types>DiscoveryProxy</Types>
        <XAddrs>http://192.168.2.2/wsd/mex</XAddrs>
        <MetadataVersion>1</MetadataVersion>
      </ProbeMatch>                                          }1403
    </ProbeMatches>
  </Body>
</Envelope>
```

FIG.12A

```
<Envelope>
  <Header>
    <Action>Probe</Action>
    <MessageID>1</MessageID>
    <To>urn:discovery</To>
  </Header>
  <Body>
    <Probe>
      <Types>Printer</Types>
    </Probe>
  </Body>
</Envelope>
```

FIG.12B

```
<Envelope>
  <Header>
    <Action>ProbeMatch</Action>
    <MessageID>1</MessageID>
    <To>anonymous</To>
  </Header>
  <Body>
    <ProbeMatches>
      <ProbeMatch>
        <EndpointReference>
          <Address>urn:uuid:234567</Address>
        </EndpointReference>
        <Types>Printer</Types>
        <XAddrs>http://192.168.1.1/wsd/mex</XAddrs>
        <MetadataVersion>1</MetadataVersion>
      </ProbeMatch>
    </ProbeMatches>
  </Body>
</Envelope>
```

FIG.15

```
<Envelope>
  <Header>
    <Action>Probe</Action>
    <MessageID>1</MessageID>
    <To>urn:discovery</To>
  </Header>
  <Body>
    <Probe>
      <Types>Printer</Types>
    </Probe>
  </Body>
</Envelope>
```

*FIG.16A*

```
<Envelope>
  <Header>
    <Action>Hello</Action>
    <MessageID>1</MessageID>
    <To>urn:discovery</To>
  </Header>
  <Body>
    <Hello>
      <EndpointReference>
        <Address>urn:uuid:abcdef</Address>
      </EndpointReference>
      <Types>DiscoveryProxy</Types>
      <XAddrs>http://192.168.0.2/wsd/mex</XAddrs>
      <MetadataVersion>1</MetadataVersion>
    </Hello>
  </Body>
</Envelope>
```

*FIG.16B*

```
<Envelope>
  <Header>
    <Action>Hello</Action>
    <MessageID>1</MessageID>
    <To>urn:discovery</To>
  </Header>
  <Body>
    <Hello>
      <EndpointReference>
        <Address>urn:uuid:ghijkl</Address>
      </EndpointReference>
      <Types>DiscoveryProxy</Types>
      <XAddrs>http://192.168.1.2/wsd/mex</XAddrs>
      <MetadataVersion>1</MetadataVersion>
    </Hello>
  </Body>
</Envelope>
```

*FIG.16C*

```
<Envelope>
  <Header>
    <Action>Hello</Action>
    <MessageID>1</MessageID>
    <To>urn:discovery</To>
  </Header>
  <Body>
    <Hello>
      <EndpointReference>
        <Address>urn:uuid:mnopqr</Address>
      </EndpointReference>
      <Types>DiscoveryProxy</Types>
      <XAddrs>http://192.168.2.2/wsd/mex</XAddrs>
      <MetadataVersion>1</MetadataVersion>
    </Hello>
  </Body>
</Envelope>
```

FIG.19

```
<Envelope>
  <Header>
    <Action>ProbeMatch</Action>
    <MessageID>1</MessageID>
    <To>anonymous</To>
  </Header>
  <Body>
    <ProbeMatches>
      <ProbeMatch>                                            ⎫
        <EndpointReference>                                   ⎪
          <Address>urn:uuid:abcdef</Address>                  ⎪
        </EndpointReference>                                  ⎪
        <Types>DiscoveryProxy</Types>                         ⎬ 2301
        <XAddrs>http://192.168.0.2/wsd/mex</XAddrs>           ⎪
        <MetadataVersion>1</MetadataVersion>                  ⎪
        <Subnet>Inside</Subnet>                               ⎪
      </ProbeMatch>                                           ⎭
      <ProbeMatch>                                            ⎫
        <EndpointReference>                                   ⎪
          <Address>urn:uuid:ghijkl</Address>                  ⎪
        </EndpointReference>                                  ⎪
        <Types>DiscoveryProxy</Types>                         ⎬ 2302
        <XAddrs>http://192.168.1.2/wsd/mex</XAddrs>           ⎪
        <MetadataVersion>1</MetadataVersion>                  ⎪
        <Subnet>Outside</Subnet>                              ⎪
      </ProbeMatch>                                           ⎭
      <ProbeMatch>                                            ⎫
        <EndpointReference>                                   ⎪
          <Address>urn:uuid:mnopqr</Address>                  ⎪
        </EndpointReference>                                  ⎪
        <Types>DiscoveryProxy</Types>                         ⎬ 2303
        <XAddrs>http://192.168.2.2/wsd/mex</XAddrs>           ⎪
        <MetadataVersion>1</MetadataVersion>                  ⎪
        <Subnet>Outside</Subnet>                              ⎪
      </ProbeMatch>                                           ⎭
    </ProbeMatches>
  </Body>
</Envelope>
```

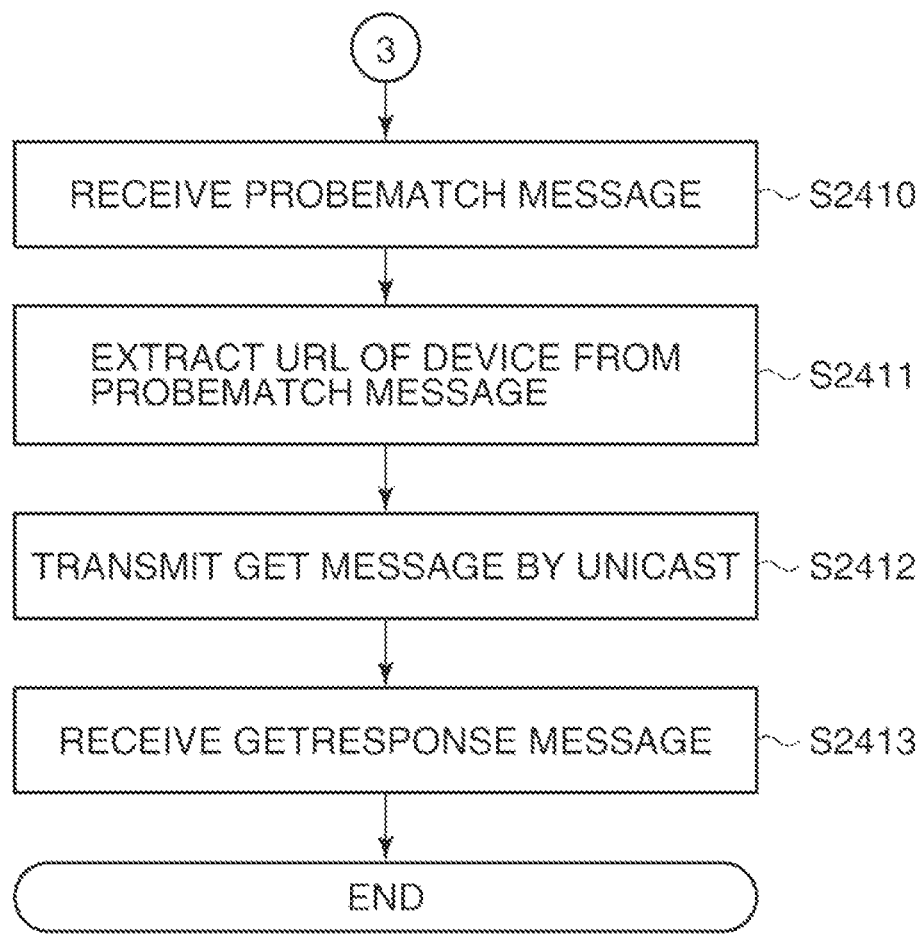

FIG.21A

```
<Envelope>
  <Header>
    <Action>Hello</Action>
    <MessageID>1</MessageID>
    <To>urn:discovery</To>
  </Header>
  <Body>
    <Hello>
      <EndpointReference>
        <Address>urn:uuid:abcdef</Address>
      </EndpointReference>
      <Types>DiscoveryProxy</Types>
      <XAddrs>http://192.168.0.2/wsd/mex</XAddrs>
      <MetadataVersion>1</MetadataVersion>
    </Hello>
  </Body>
</Envelope>
```

*FIG.21B*

```
<Envelope>
  <Header>
    <Action>ProbeMatch</Action>
    <MessageID>1</MessageID>
    <To>anonymous</To>
  </Header>
  <Body>
    <ProbeMatch>
      <EndpointReference>
        <Address>urn:uuid:ghijkl</Address>
      </EndpointReference>
      <Types>DiscoveryProxy</Types>
      <XAddrs>http://192.168.1.2/wsd/mex</XAddrs>
      <MetadataVersion>1</MetadataVersion>
    </ProbeMatch>
  </Body>
</Envelope>
```

FIG.21C

```
<Envelope>
  <Header>
    <Action>ProbeMatch</Action>
    <MessageID>1</MessageID>
    <To>anonymous</To>
  </Header>
  <Body>
    <ProbeMatch>
      <EndpointReference>
        <Address>urn:uuid:mnopqr</Address>
      </EndpointReference>
      <Types>DiscoveryProxy</Types>
      <XAddrs>http://192.168.2.2/wsd/mex</XAddrs>
      <MetadataVersion>1</MetadataVersion>
    </ProbeMatch>
  </Body>
</Envelope>
```

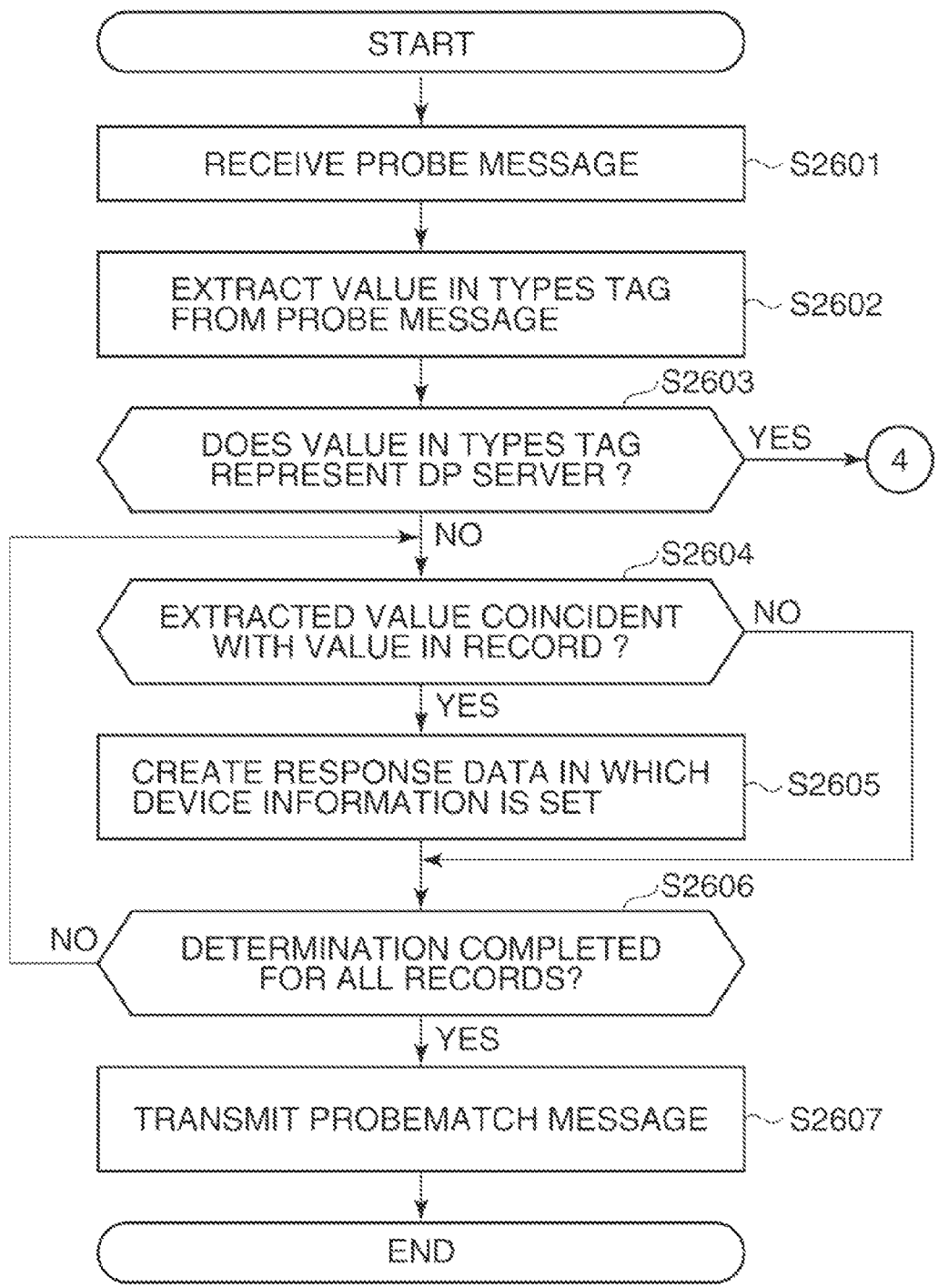

DEVICE SEARCH APPARATUS AND METHOD, AND DEVICE SEARCH SERVER, DEVICE SEARCH SYSTEM, AND STORAGE MEDIUM

BACKGROUND OF THE INVENTION

1. Field of the Invention

The present invention relates to a device search apparatus and method for searching, via a network, for a device such as an image forming apparatus, and relates to a device search server, a device search system, and a storage medium.

2. Description of the Related Art

Heretofore, a device such as an image forming apparatus can be utilized from a client PC via a network. At that time, the client PC is required to search for and find the device on the network and install driver software for using the found device.

As a technique to perform such processing, WSD (Web Services on Devices) has been proposed by Microsoft Corporation, in which a WS-Discovery specification is used to search for a device on a network. A device search system has also been proposed, in which a client PC sends by multicast a request for device search to a DP (discovery proxy) server and the DP server sends back a search result that includes device information held in the DP server. Further, in a WS-Discovery specification recommended by the OASIS (Organization for the Advancement of Structured Information Standards), a method is defined in which a client PC sends a request for DP server search to a DP server that sends back a search result including DP server information held therein.

Meanwhile, with the progress of network technologies, it becomes possible to construct a large scale network by connecting networks together using routers or other connection devices. In such a network, routers are generally utilized in settings that prevent broadcast and multicast from passing through the routers since broadcast and multicast can affect traffic in the entire network. Specifically, broadcast and multicast are generally utilized only within each of subnets (i.e., networks that are partitioned from one another by the routers).

With conventional network device search technologies where multicast is used, a search request packet transmitted from a client PC is unable to pass through routers in most cases, and it is therefore difficult for the client PC to find a device on a different subnet in a network environment including a plurality of subnets connected together by routers. To solve such a problem, there has been proposed a technique in which servers are provided for respective subnets, and device information and search requests are exchanged between the servers (see, for example, Japanese Laid-open Patent Publication No. 2007-97057).

With the proposed technique, however, each server is required to transfer a client PC's device search request to the server on different subnet, and also required to transfer to the client PC a search response sent back from the server on different subnet in reply to the request for device search.

Since each server automatically transfers a request for search to the server on predetermined different subnet, a problem is posed that the client PC cannot select the server on a subnet on which a device to be searched for is present.

SUMMARY OF THE INVENTION

The present invention provides a device search apparatus and method, a device search server, a device search system, and a storage medium, which are able to easily search for and find a device on different subnet in a network environment including a plurality of subnets connected together.

According to a first aspect of this invention, there is provided a device search apparatus connected to a network including a plurality of subnets and configured to request at least one of device search servers on the plurality of subnets to perform a device search and receive device information sent back as a search result, which comprises a first control unit configured to transmit by multicast a first message in which information representing device search server or device is set, and configured to extract, from a second message received from at least one of the device search servers on the plurality of subnets, a URL of the device search server on another subnet other than the network to which the device search apparatus is connected, a second control unit configured to transmit by unicast a third message, in which a device type to be searched is set, to the device search server on the other subnet based on the URL extracted from the second message, and configured to extract a URL of a device on the other subnet from a fourth message received from the device search server on the other subnet, and a third control unit configured to acquire device information from a reply message sent back from the device on the other subnet based on the URL extracted from the fourth message.

According to a second aspect of this invention, there is provided a device search server connected to a network including a plurality of subnets and configured to receive a request for device search from a device search apparatus connected to any of the plurality of subnets and transmit, as a search result, device information held in the device search server to the device search apparatus, which comprises a holding unit configured to hold pieces of information about respective ones of devices and device search servers on the plurality of subnets, a first determination unit configured to determine whether a device/server type of each of the pieces of information held in the holding unit coincides with a device/server type represented by the request for device search received from the device search apparatus, a creation unit configured to create response data according to a result of determination by the first determination unit, and a transmission unit configured to transmit, as the search result, the created response data to the device search apparatus.

According to a third aspect of this invention, there is provided a device search system comprising the device search apparatus described in the first aspect and the device search server described in the second aspect.

According to a fourth aspect of this invention, there is provided a device search method for the device search apparatus described in the first aspect.

According to a fifth aspect of this invention, there is provided a device search method for the device search server described in the second aspect.

According to a sixth aspect of this invention, there is provided a storage medium storing a program for executing the device search method described in the fourth aspect.

According to a seventh aspect of this invention, there is provided a storage medium storing a program for executing the device search method described in the fifth aspect.

With this invention, the device search apparatus (client PC) is able to easily search for and find a device on different subnet in a network environment including a plurality of subnets connected together.

Further features of the present invention will become apparent from the following description of exemplary embodiments with reference to the attached drawings.

BRIEF DESCRIPTION OF THE DRAWINGS

FIG. 8 is a view showing an example of pieces of device/DP server information held by a device/DP server information holding unit of the DP server;

FIG. 9 is a view showing an example of a Hello message transmitted by multicast from the device concerned;

FIG. 10 is a view showing an example of a GetResponse message transmitted by the device;

FIG. 11A is a view showing an example of a Probe message transmitted by multicast from the client PC;

FIG. 11B is a view showing an example of a ProbeMatch message transmitted to the client PC from the DP server concerned;

FIG. 12A is a view showing an example of a Probe message transmitted by unicast by the client PC;

FIG. 12B is a view showing an example of a ProbeMatch message transmitted to the client PC from the DP server concerned;

FIG. 15 is a view showing an example of a Probe message transmitted by multicast from the client PC in a second embodiment of this invention;

FIGS. 16A to 16C are views each showing an example of a Hello message transmitted from the DP server;

FIG. 19 is a view showing an example of a ProbeMatch message transmitted from the DP server to the client PC in a third embodiment of this invention;

FIGS. 20A and 20B are a flowchart showing a process performed by the client PC at the device search in the third embodiment;

FIGS. 21A to 21C are views each showing an example of a Hello message and a ProbeMatch message, which are transmitted from the DP server to the client PC in a fourth embodiment of this invention;

FIGS. 22A and 22B are a flowchart showing a process performed by DP server at the device search in the fourth embodiment.

DESCRIPTION OF THE EMBODIMENTS

The present invention will now be described in detail below with reference to the drawings showing preferred embodiments thereof.

First Embodiment

Figure 1:
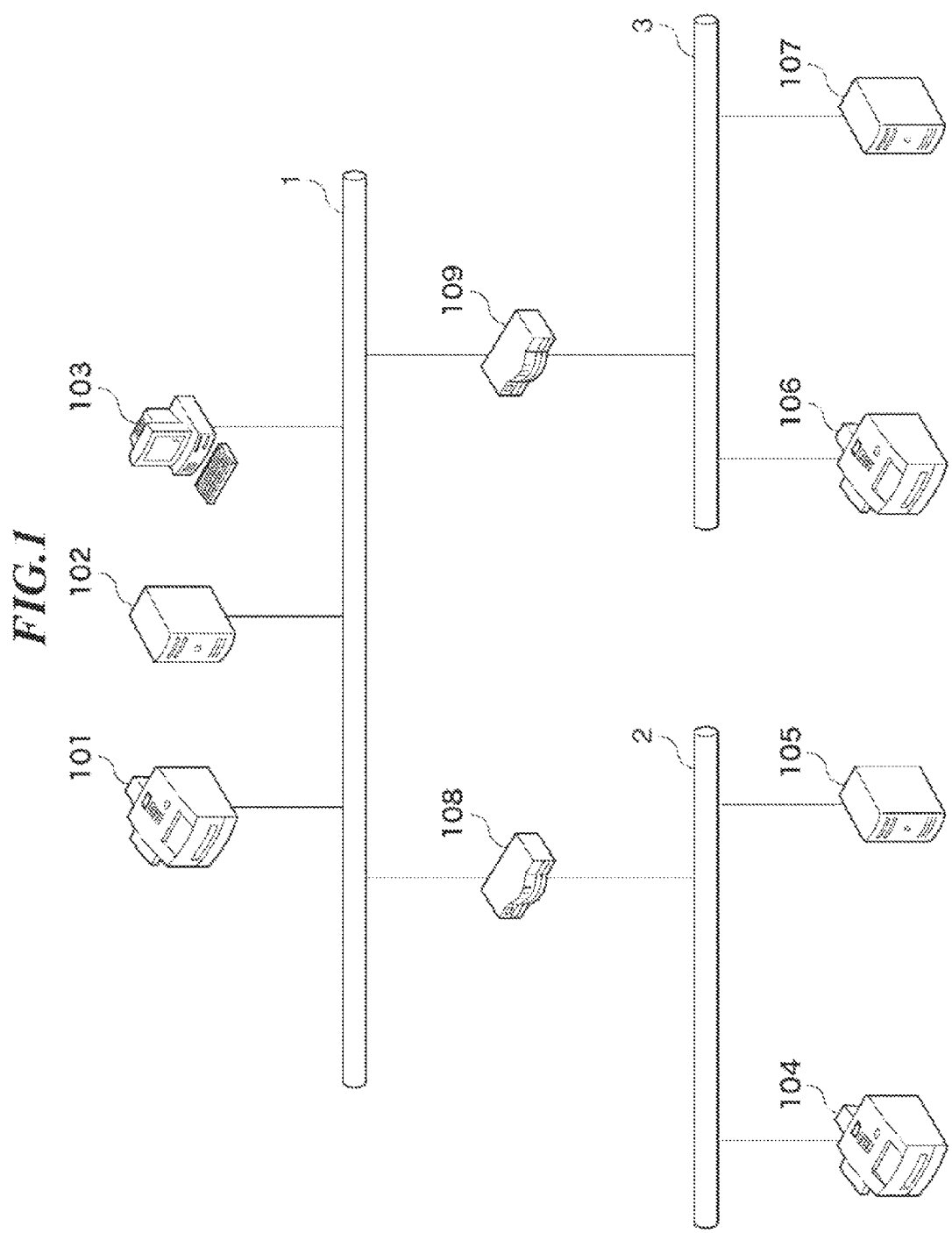
FIG. 1 is a view showing an example construction of a device search system according to embodiments of this invention.

FIG. 1 shows an example construction of a device search system according to embodiments of this invention.

As shown in FIG. 1, the device search system includes a first to third subnets 1 to 3. A discovery proxy server (hereinafter, referred to as the DP server) 102 and a client PC 103 are connected to the first subnet 1, a device 104 and a DP server 105 are connected to the second subnet 2, and a device 106 and a DP server 107 are connected to the third subnet 3. The first subnet 1 is connected to the second subnet 2 via a router 108 and connected to the third subnet 3 via a router 109, whereby a network is configured, so that the aforementioned terminal devices each connected to any of the first to third subnets can communicate with one another. When receiving a broadcast or a multicast from one of the associated subnets, each router 108 or 109 does not transfer it to the other subnet on an as-is basis. In other words, broadcast communication or multicast communication can be performed only within each individual subnet.

The devices 101, 104, and 106 are each implemented by, e.g., an image forming apparatus. The DP servers 102, 105, and 107 each serve as a device search server, and the client PC 103 serves as a device search apparatus.

Next, a description will be given of the hardware and software structures of the device 101 and the DP server 102. Since the devices 104, 106 each have the same structure as the device 101, a description of these devices 104, 106 will be omitted. A description of the DP servers 105, 107 and the client PC 103 each having the same structure as the DP server 102 will also be omitted.

Figure 2:
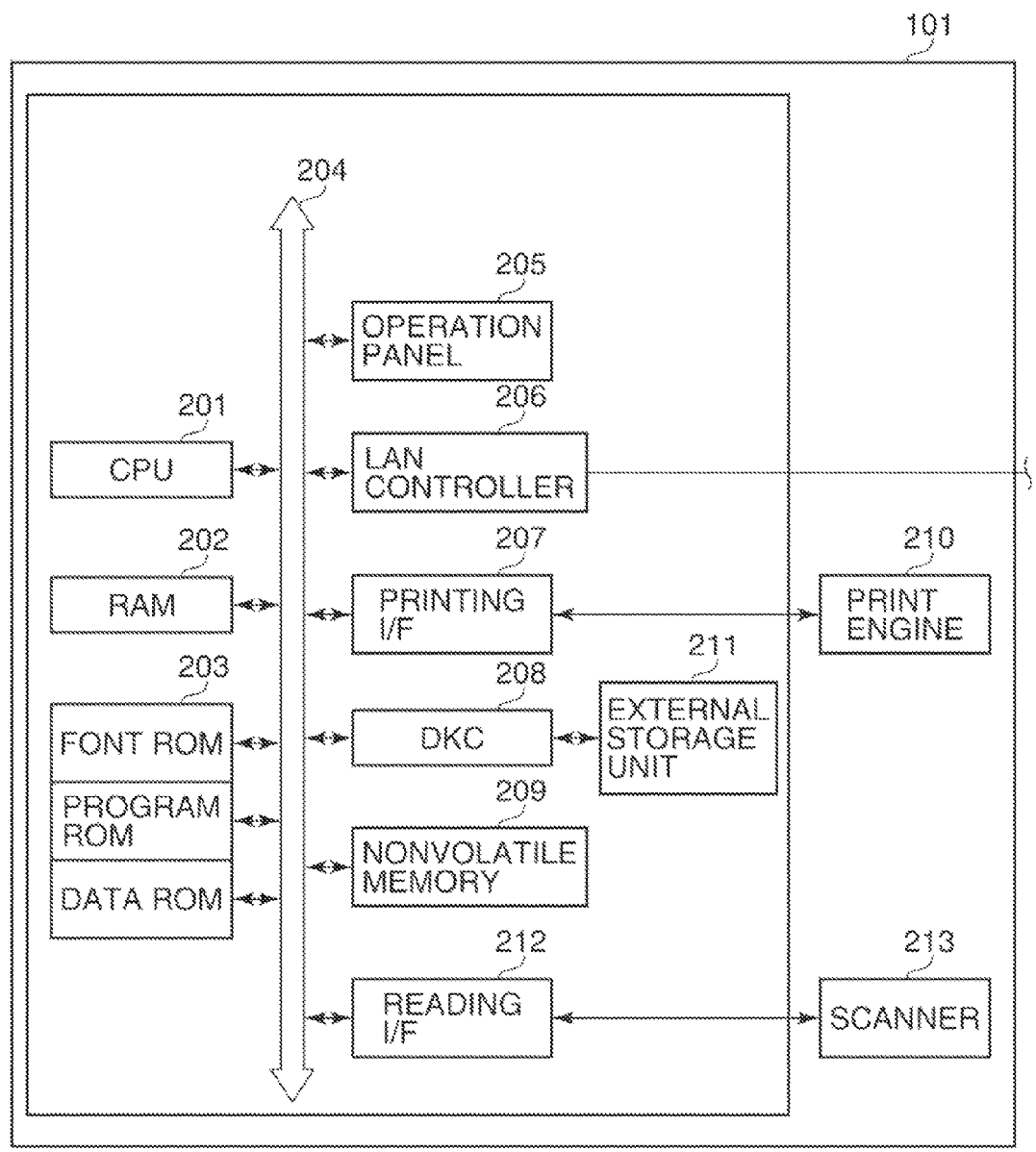
FIG. 2 is a block diagram showing the hardware structure of devices shown in FIG. 1.

FIG. 2 shows in block diagram the hardware structure of the device 101. In the following, the device 101 implemented by an MFP will be described by way of example.

As shown in FIG. 2, the device 101 includes a CPU 201 that overall controls respective parts of the device 101, which are connected to a system bus 204, according to a control program stored in a program ROM of a ROM 203. For example, the CPU 201 controls output of output information (image signal) to a print engine 210, which is connected via a printing interface (I/F) 207 to the bus 204, and controls input of an image signal from a scanner 213 connected via a reading I/F 212 to the bus 204. The CPU 201 is able to communicate via a LAN controller 206 with apparatuses on the network.

The ROM 203 has the program ROM that stores, e.g., control programs executable by the CPU 201, a font ROM that stores, e.g., font data (including outline font data) for use in generating the output information, and a data ROM that stores, e.g., information utilized by the device 101.

The RAM 202 mainly functions as a main memory and a work area for use by the CPU 201. The memory capacity of the RAM 202 can be expanded by means of an option RAM connectable to an expansion port (not shown). The RAM 202 has an output information developing area, an environment data storage area, and others.

The external storage unit 211 is implemented by a hard disk, an IC card, or the like. Access to the storage unit 211 is controlled by a disk controller (DKC) 208. The external storage unit 211 stores font data, emulation program, form data, etc., and is used as a job storage area in which a print job is temporally spooled and the spooled job is externally controlled. The external storage unit 211 is also used as a BOX data storage area for holding BOX data such as image data read by the scanner 213 and image data for a print job. The BOX data is printed or referred to via the network. The external storage unit 211 is not limited to one in number, and a plurality of external storage units can be provided. It is also possible to configure that a plurality of devices, such as an option font card that stores option fonts and an external memory that stores a program for interpreting printer control language of different language system, are connectable to the DKC 208.

An operation panel 205 is implemented by, e.g., a touch panel having software keys that enable a user to input various information. A nonvolatile memory 209 stores various setting information, which are set via the operation panel 205.

The device 101 can optionally be mounted with extension apparatuses, such as a finisher having a stapling function and a sorting function and an apparatus having a double-sided printing function. Operations of these extension apparatuses are controlled by the CPU 201.

Figure 3:
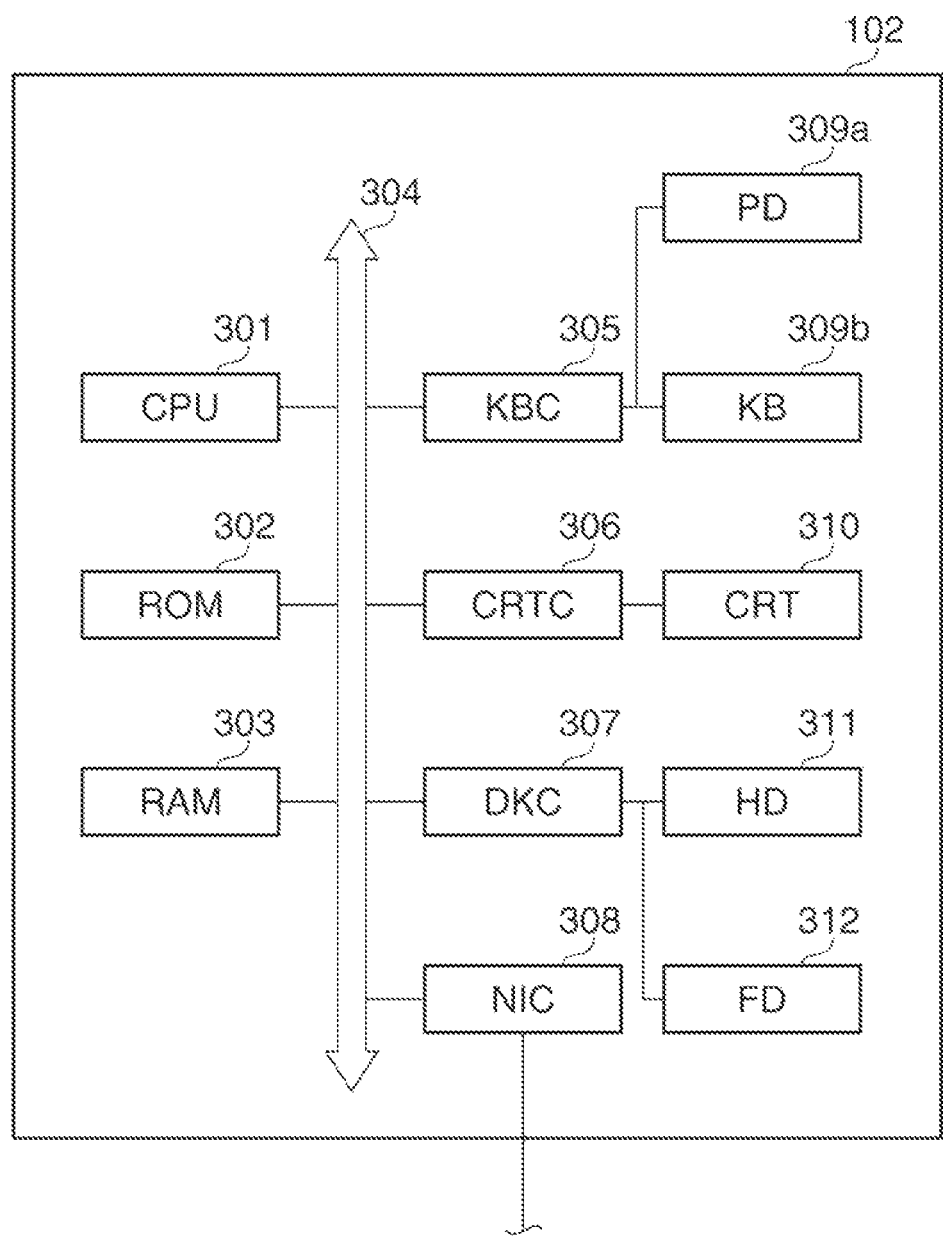
FIG. 3 is a block diagram showing the hardware structure of DP servers shown in FIG. 1.

FIG. 3 shows in block diagram the hardware structure of the DP server 102. For example, the DP server 102 is implemented by a general-purpose PC (personal computer).

Referring to FIG. 3, a CPU 301 executes a process (described later) based on a program stored in a ROM 302 or a hard disk (HD) 311. A RAM 303 is used as a main storage unit of the CPU 301. A keyboard controller (KBC) 305 performs processing on information input from a pointing device (PD) 309*a* or a keyboard (KB) 309*b*. A display control unit (CRTC) 306 has an internal video memory, draws image data on the video memory according to an instruction from the CPU 301, and outputs the image data as a video signal to a display device (CRT) 310. Although the display device 310 implemented by a CRT (cathode ray tube) is shown by way of example, this is not limitative and any type of display device such as a liquid crystal display unit can be used.

A disk controller (DKC) 307 controls access to the HD 311 and access to a floppy (registered trademark) disk 312. The HD 311 stores an operating system (OS), application programs running on the OS, etc.

A network interface card (NIC) 308 is an interface for being connected to the network, and controls communication with other devices on the network.

When electric power to the DP server 102 having the above-described construction is turned on, the CPU 301 of the server reads the OS from the HD 311 into the RAM 303 according to a boot program stored in the ROM 302, and functions as an information processing apparatus.

Figure 4:
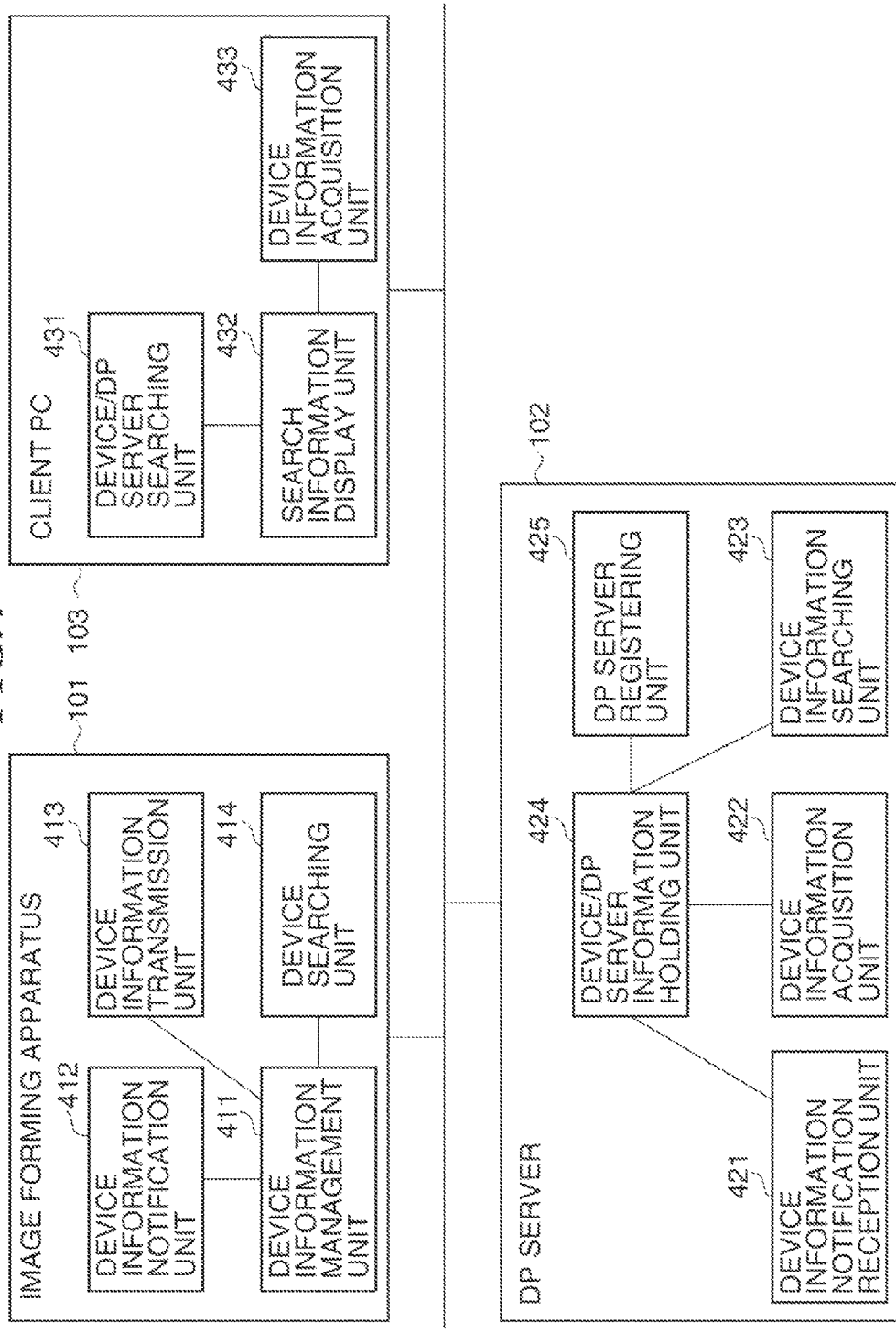
FIG. 4 is a block diagram showing the software structure of the device, DP server, and client PC, which are shown in FIG. 1.

FIG. 4 shows in block diagram the software structure of the device 101, DP server 102, and client PC 103.

The device 101 includes a device information management unit (hereinafter abbreviated as the management unit (ditto for other units)) 411 that manages device information for the device 101. The device information includes, e.g., device name, model name, etc., as will be described later referring to FIG. 8.

A notification unit 412 of the device 101 transmits a participation/departure notification by multicast, where required. A notification reception unit 421 of the DP server 102 receives the participation/departure notification, and based on a type of the received notification, performs processing on corresponding device information held in a device/DP server information holding unit 424. When determining based on a result of the processing that device information must be acquired, an acquisition unit 422 transmits a request for acquisition of device information to the device 101.

A transmission unit 413 of the device 101 receives the acquisition request via the network, and transmits corresponding device information managed by the management unit 411 to the request source. An acquisition unit 422 of the DP server 102 holds the replied device information into the holding unit 424.

A device/DP server searching unit 431 of the client PC 103 transmits by multicast a request for search to the own subnet, and transmits by unicast a request for search to each of the other subnets. In the case of the client PC 103, the term "the own subnet" refers to the subnet 1 directly connected to the client PC 103 among the subnets 1 to 3 partitioned from one another by the routers 108, 109, and the term "the other subnets" refers to the subnets 2, 3 other than the own subnet 1.

A device information acquisition unit 433 of the client PC 103 transmits by multicast a request for acquisition of device information to the device 101. A device searching unit 414 of the device 101 receives by multicast a request for device search, searches device information in the management unit 411, and transmits a search result as a search response in reply to the request for device search.

A searching unit 423 of the DP server 102 receives a request for device/DP server information search transmitted from the client PC 103, searches device/DP server information in the holding unit 424 according to a specified search condition, and transmits a search result to the client PC 103.

A search information display unit 432 of the client PC 103 displays the replied device/DP server information on the display device of the client PC 103. It should be noted that pieces of DP server information (described later) to be searched are registered beforehand into the holding unit 424 by a DP server registering unit 425 in accordance with a manual operation.

Figure 5:
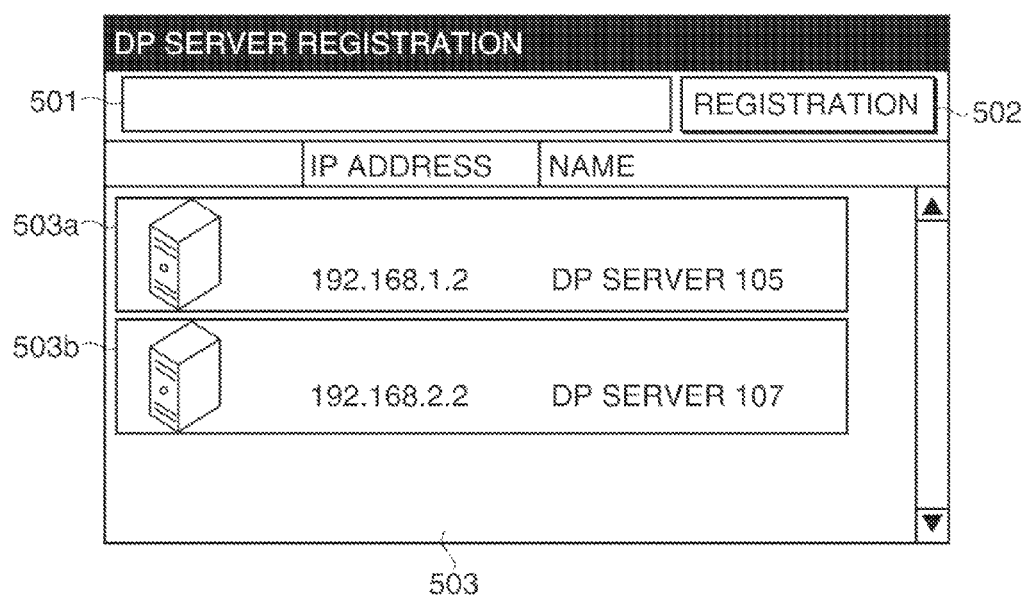
FIG. 5 is a view showing an example of UI screen displayed on a display device of the client PC when pieces of information about DP servers on subnets other than a subnet to which the client PC is connected are registered into the DP server on the subnet.

FIG. 5 shows an example UI screen displayed on the display device of the client PC 103 by the display unit 432 of the PC 103 when pieces of information about DP servers 105, 107 on other subnets 2, 3 are registered into the DP server 102 on the subnet 1 to which the client PC 103 is connected.

Referring to FIG. 5, reference numeral 501 denotes an input field for inputting an IP address and name of a DP server to be registered. Input of the server name can be omitted. When a registration button 502 is depressed, information input to the input field 501 is registered by the DP server registering unit 425 into the DP server 102. The DP server 102 transmits a Probe message by unicast to the registered DP server, receives a ProbeMatch message therefrom, and acquires information about the registered DP server. In an area 503 of the UI screen, there is displayed a list of already registered information about DP servers on other subnets. In the example shown in FIG. 5, DP server information 503*a* about the DP server 105 and DP server information 503*b* about the DP server 107 are displayed.

Figure 6:
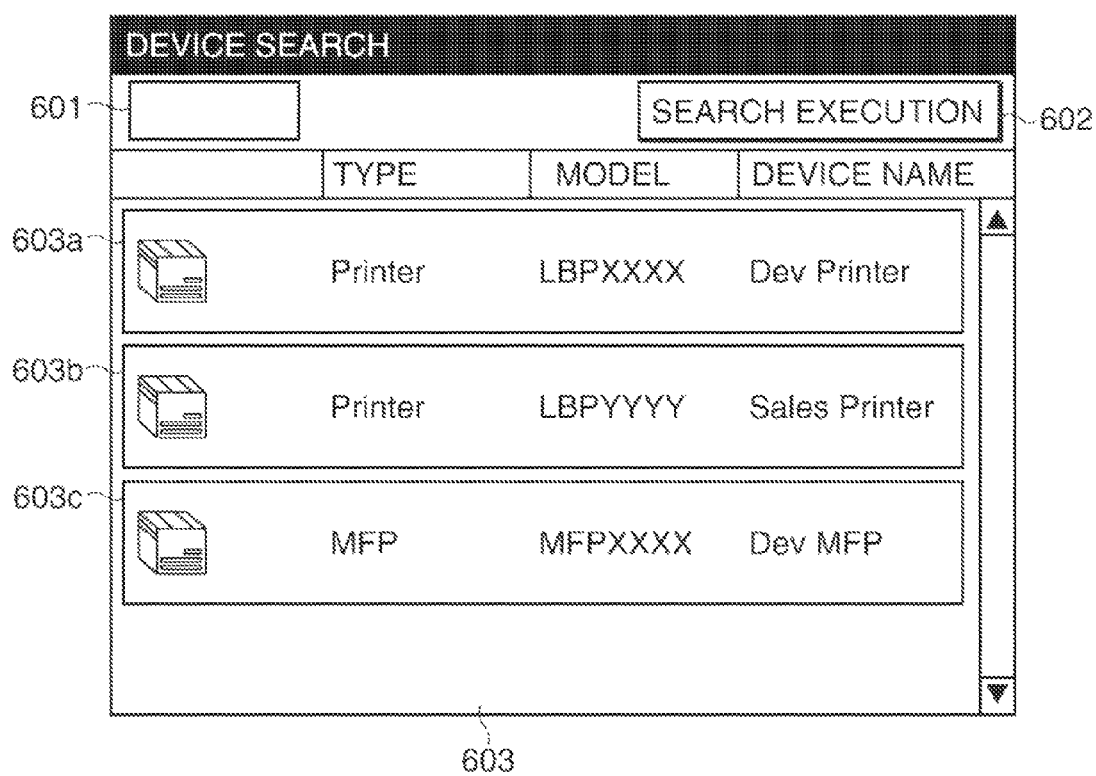
FIG. 6 is a view showing an example UI screen displayed on the display device of the client PC when a device search is performed by the client PC.

FIG. 6 shows an example UI screen displayed on the display device of the client PC 103 when a device search is performed by the client PC 103.

Referring to FIG. 6, reference numeral 601 denotes an input field for specifying a search condition, e.g., a device type to be searched. The device type can be specified by a keyword such as "MFP" or "Printer". If no device type has been input into the input field 601, searching will be made for all the device types. When a search execution button 602 is depressed, the client PC 103 sends a request for device search to the DP server 102 and acquires a search result (device information) therefrom. The acquired device information is displayed on an area 603. In the example shown in FIG. 6, pieces of device information 603a, 603b, and 603c each including device type, model name, and device name are displayed in the area 603.

Figure 7:
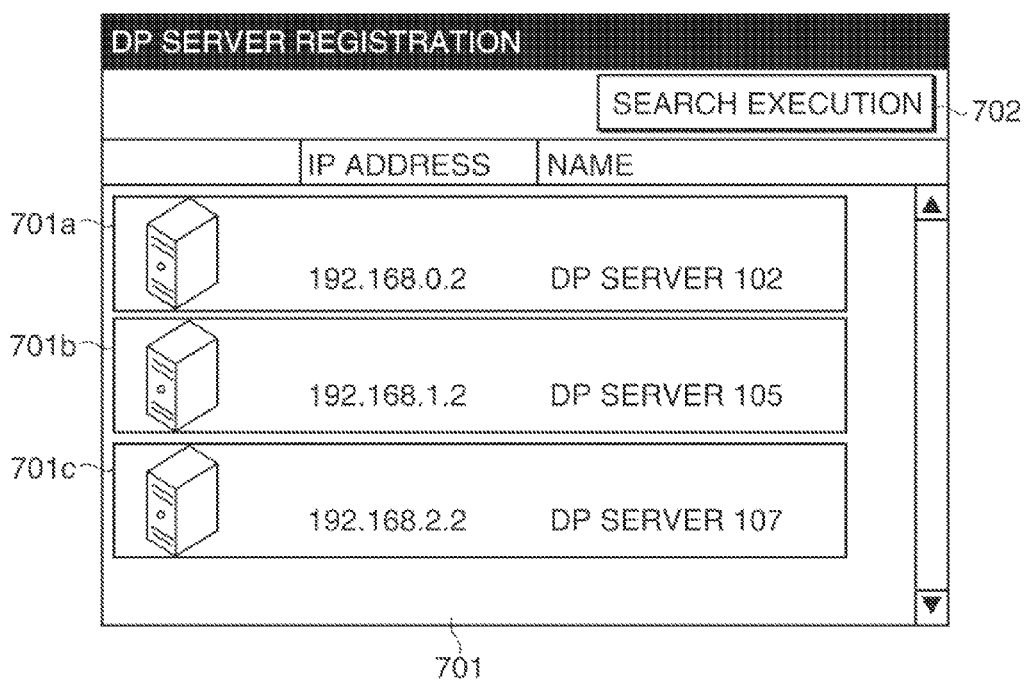
FIG. 7 is a view showing an example UI screen displayed on the display device of the client PC when a DP server is selected and a request for device search is transmitted to the selected DP server.

FIG. 7 shows an example UI screen displayed on the display device of the client PC 103 when a DP server is selected and a request for device search is transmitted to the selected DP server.

When a device search is performed by the DP server 102 under the search condition specified on the UI screen shown in FIG. 6, pieces of information about DP servers 105, 107 on the subnets 2, 3 other than the subnet 1 connected with the DP server 102 are displayed on an area 701 of the UI screen, as shown in FIG. 7. Reference numerals 701b, and 701c denote information about the DP servers 105, 107, and reference numeral 701a denotes information about the DP server 102, which is displayed on the area 701 when the DP server 102 sends back its own DP server information as well as information about DP servers 105, 107 on other subnets.

When desired DP server information is selected from among pieces of DP server information 701a, 701b, and 701c displayed on the area 701 and a search execution button 702 is depressed, the client PC 103 transmits a request for device search to the DP server represented by the selected information. It should be noted that plural pieces of DP server information can simultaneously be selected from among the DP server information 701a, 701b, and 701c displayed on the area 701.

If no DP server is selected, the client PC 103 transmits the request for device search to all the DP servers represented by pieces of DP server information sent back from the DP server 102.

FIG. 8 shows an example of pieces of device/DP server information held by the device/DP server information holding unit 424 of the DP server 102.

Referring to FIG. 8, reference numeral 800 denotes pieces of device/DP server information, which are held in the form of records. Each record is comprised of an ID field 801, UUID field 802, version field 803, device type filed 804, model name field 805, device name field 806, URL field 807, and IP address field 808.

The ID field 801 of each record stores an ID for identifying a device/DP server. The UUID field 802 stores a UUID for globally identifying the device/DP server. The version field 803 stores a value representing a version of the device/DP server information. The device type field 804 stores a value representing a type of the device/DP server. In the illustrated example, values "Printer" and "DiscoveryProxy" in the device type fields 804 respectively represent a printer and a discovery proxy. As a value representing another device/DP server type, there can be mentioned, for example, a value "MFP" representing a multi-function peripheral. The model name field 805 of each record stores a model name of the device/DP server (such as "LBPXXXX"). The device name field 806 stores a name of the device/DP server, which is set by a manager. The URL field 807 stores a URL for acquiring the device/DP server information. The IP address field 808 stores an IP address of the device/DP server.

Next, a description will be given of how the device information about the device 104 is registered into the DP server 105.

When the device 104 is activated or when the information thereabout is changed, the device 104 transmits by multicast a Hello message of XML format such as that shown in FIG. 9 to notify the presence of the device 104. The Hello message has a structure that includes a header part 901 surrounded by a <Header> tag and a </Header> tag and a body part 902 surrounded by a <Body> tag and a </Body> tag and begins with an <Envelope> tag and ends with an </Envelope> tag. This structure also applies to all the messages used in this embodiment.

The header part 901, which serves as a common header that does not depend on the contents of the message, includes an <Action> tag including an identifier that represents a type of the message, a <MessageID> tag including an identifier that uniquely identifies the message, and a <To> tag including an identifier that represents a transmission destination of the message.

On the other hand, the body part 902 has a structure that varies according to the contents of the message. In the message shown in FIG. 9, a <Hello> tag is present under the <Body> tag and indicates that the message is a Hello message. Between the <Hello> tag and a </Hello> tag, there are provided an <EndpointReference> tag including an <Address> tag that includes device address information, a <Types> tag including device type information, an <XAddrs> tag including a URL for acquiring device information, and <MetadataVersion> tag including a value that represents a version of the device information.

The DP server 105 extracts from the Hello message the value in the <Address> tag in the <EndpointReference> tag that represents the UUID for globally identifying the device 104, the value in the <Types> tag representing the device type, the value in the <MetadataVersion> tag representing the version of the device information, and the value in the <XAddrs> tag representing the URL for acquiring the device information. Then, the DP server 105 stores these pieces of extracted information and the IP address of transmission source (device 104) of the Hello message into the device/DP server information holding unit 424, and transmits by unicast a Get message of XML format to the URL indicated in the <XAddrs> tag. The Get message only includes a header part that includes an <Action> tag indicating that the message is a Get message.

When receiving the Get message, the device information transmission unit 413 of the device 104 transmits a GetResponse message such as that shown in FIG. 10. The GetResponse message shown in FIG. 10 includes a body part configured to include pieces of device information, which are listed under a <Metadata> tag. Between the <Metadata> tag and a </Metadata> tag, there are provided MetadataSection parts 1101, 1102, and 1103 each surrounded by a <MetadataSection> tag and a </MetadataSection> tag. The type of information contained in each MetadataSection part is specified by a tag indicated below the <MetadataSection> tag.

The MetadataSection part 1101 includes a <ThisDevice> tag that stores device information. Specifically, the <ThisDevice> tag includes a <FriendlyName> tag that stores a name given to the device 104, a <FirmwareVersion> tag that stores a value representing a firmware version of the device 104, and a <SerialNumber> tag that stores a serial number of the device 104.

The MetadataSection part 1102 includes a <ThisModel> tag that stores model information about the device 104. Specifically, the <ThisDevice> tag includes a <Manufacturer> tag that stores a manufacturer name of the device 104, a <ManufacturerUrl> tag that stores a device manufacturer URL, a <PresentationUrl> that stores a URL of a device information source such as a web page, and a <ModelName> tag that stores a model name of the device 104.

The MetadataSection part 1103 includes a <Relationship> tag that stores information representing an internal service (e.g., print service) provided by the device 104. Specifically, under the <Relationship> tag, there is a <Hosted> tag in which there are provided an <EndpointReference> tag including an <Address> tag that stores address information for utilizing the service, a <Types> tag that stores information about a type of the service, and a <ServiceId> tag that stores an identifier for identifying the service.

The DP server 105 extracts from the device information received from the device 104 the value in the <FriendlyName> tag representing the device name and the value in the <ModelName> tag representing the model name, and stores these values into the device/DP server information holding unit 424. Similarly, device information about the device 106 is registered into the DP server 107.

Next, a description will be given of how the device information about the device 104 registered into the DP server 105 is deleted.

The device 104 transmits a Bye message by multicast when stopping its operation such as when being shutdown. The Bye message includes a body part that includes a <Bye> tag representing that the message is a Bye message. In the <Bye> tag, there is an <EndpointReference> tag including an <Address> tag that stores address information of the device 104. The DP server 105 extracts from the Bye message a value in the <Address> tag that represents UUID information, and deletes corresponding device information from the device/DP server information holding unit 424. Device information about the device 106 registered into the DP server 107 can similarly be deleted.

Next, a description will be given of how the client PC 103 searches for and finds the devices 104, 106 on other subnets 2, 3 using the DP server 102 on the subnet 1.

The client PC 103 transmits by multicast a Probe message of XML format such as that shown in FIG. 11A. The Probe message shown in FIG. 11A includes a body part that includes a <Probe> tag indicating that the message is a Probe message. In the <Probe> tag, there is a <Types> tag for specifying DiscoveryProxy.

When receiving the Probe message, the DP server 102 extracts from the message a value in the <Types> tag representing a device type, searches the device/DP server information in the device/DP server information holding unit 424 to find one or more DP servers each coincident with a search condition (device type), and transmits a ProbeMatch message such as that shown in FIG. 11B to the client PC 103.

The ProbeMatch message shown in FIG. 11B includes a body part that includes a <ProbeMatches> tag indicating that this message is a ProbeMatch message. In the <ProbeMatches> tag, there are ProbeMatch parts 1401, 1402, and 1403 each surrounded by a <ProbeMatch> tag and a </ProbeMatch> tag and each corresponding to a search result. The example shown in FIG. 11B represents that three search results are sent back. The ProbeMatch parts each have the same structure as that of the <Hello> tag in the Hello message shown in FIG. 9.

The client PC 103 extracts URLs in <XAddrs> tags from the ProbeMatch message, and displays IP addresses and names of the DP servers 102, 105, and 107 on the UI screen, as shown in FIG. 7. When, e.g., the DP server 105 on another subnet is selected and the search execution button 702 is depressed on the UI screen, the client PC 103 transmits by unicast to the DP server 105 a Probe message such as that shown in FIG. 12A. A device type to be searched, which was input on the screen shown in FIG. 6, is specified in the <Types> tag of the Probe message. When the DP server 102 or 107 is selected on the UI screen, a Probe message such as that shown in FIG. 12A is transmitted to the DP server 102 or 107.

When receiving the Probe message, the DP server 105 extracts from the message a value in the <Types> tag representing the device type, searches the device/DP server information in the device/DP server information holding unit 424 to find one or more devices each coincident with the search condition (device type), and transmits to the client PC 103 a ProbeMatch message such as that shown in FIG. 12B. Similarly, the DP server 102 or 107 transmits a ProbeMatch message when receiving the Probe message.

The client PC 103 extracts a URL in the <XAddrs> tag from the ProbeMatch message shown in FIG. 12B and transmits a Get message by unicast to an IP address of the device 104 represented by the extracted URL. The device 104 transmits a Get message such as that shown in FIG. 10, and the client PC 103 extracts device information from the Get message.

If the ProbeMatch message includes a plurality of search results (URLs), the client PC 103 transmits the Get message to the respective URLs (devices) and acquires device information from respective ones of these devices.

Figure 13:
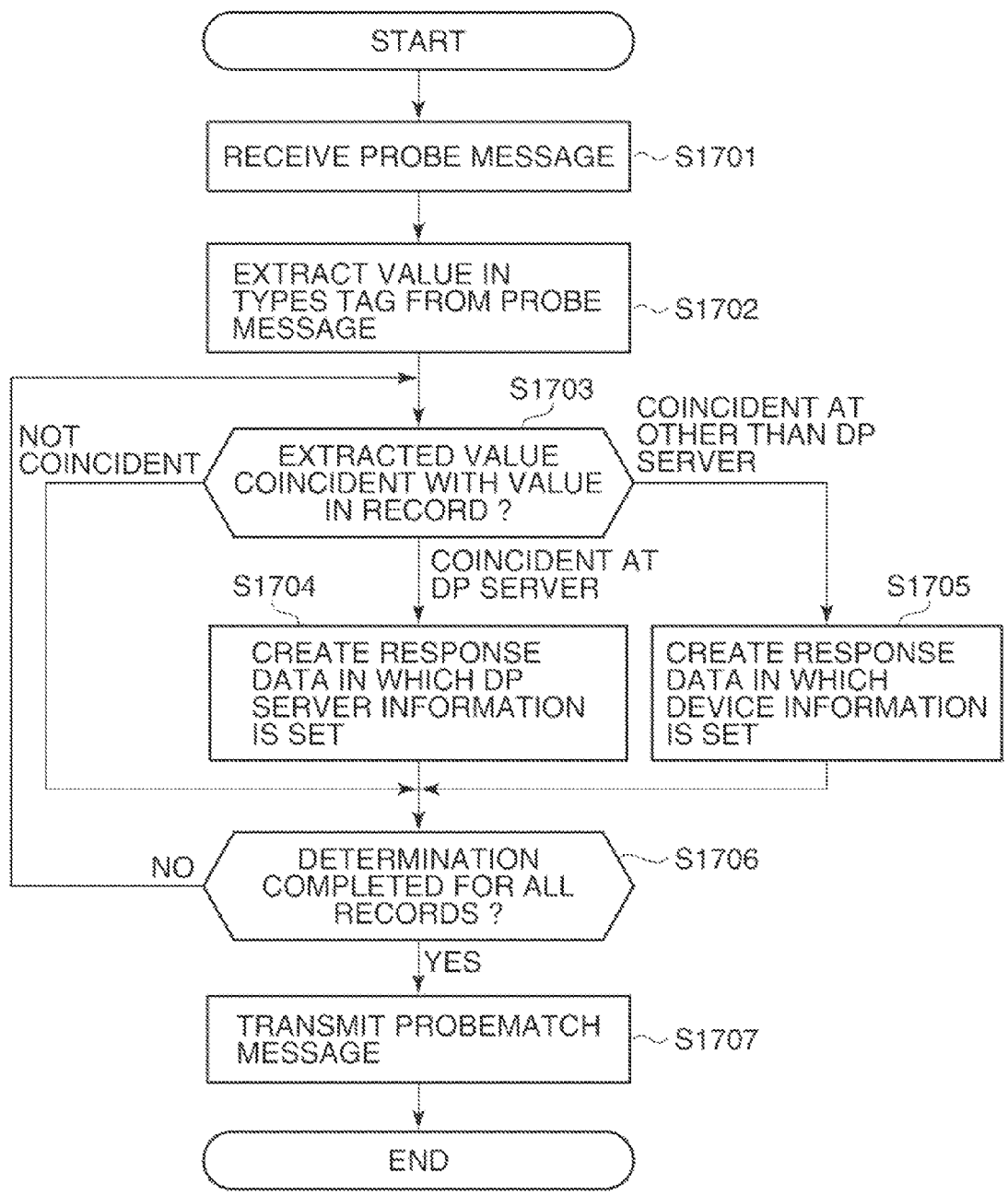
FIG. 13 is a flowchart showing a process performed by the DP server at the device search.

FIG. 13 shows in flowchart a process performed by the DP server 102 at the device search.

The DP server 102 receives a Probe message (step S1701), extracts from the Probe message a value in the <Types> tag representing a device/DP server type (step S1702), and determines whether a value in the device type field 804 of a determination object record, which is selected from among records held in the information holding unit 424 of the DP server 102, coincides with the value extracted in Step S1702 in that they represent the same type of device/DP server (step S1703). Step S1703 is an example of determination performed by a first determination unit of this invention. If it is determined in Step S1703 that both the extracted value and the value in the device type field 804 of the determination object record represent the same type of DP server (i.e., both the values are coincident with each other at DP server), the DP server 102 creates response data in which information representing such DP server is set (step S1704), and proceeds to Step S1706. On the other hand, if both the value extracted in Step S1702 and the value in the device type field 804 of the determination object record represent the same type of device (i.e., both the values are coincident with each other at other than DP server), the DP server 102 creates response data in which information representing such device is set (step S1705), and proceeds to Step S1706. If the value extracted in Step S1702 and the value in the device type field 804 of the determination object record are not coincident with each other, the flow proceeds from step S1703 to Step S1706.

In step S1706, the DP server 102 determines whether the determination in Step S1703 has been completed for all the records held in the information holding unit 424. If the answer to Step S1706 is NO, the flow returns to step S1703 in which the next record is selected as determination object record and the device/DP server type is determined for the next record. On the other hand, if the answer to Step S1706 is YES, the flow proceeds to Step S1707 where the DP server 102 combines pieces of response data created until that time into one to create a ProbeMatch message such as that shown in FIG. 11B, and transmits the ProbeMatch message to the client PC 103, whereupon the present process is completed.

Figure 14:
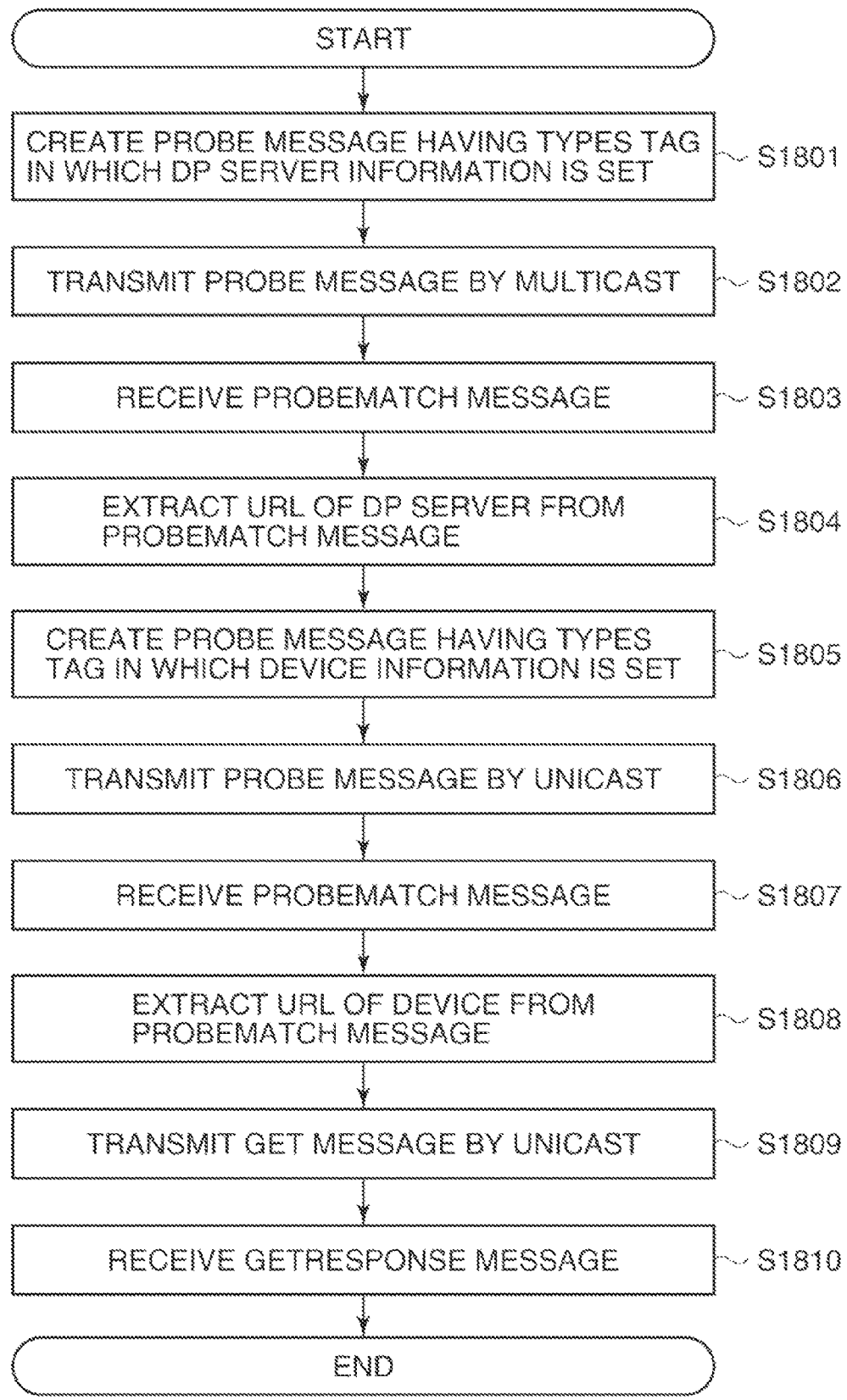
FIG. 14 is a flowchart showing a process performed by the client PC at the device search.

FIG. 14 shows in flowchart a process performed by client PC 103 at the device search.

The client PC 103 creates a Probe message having a <Types> tag in which a value representing DP server is set (step S1801), and transmits the Probe message by multicast (step S1802). The Probe message is an example of a first message in this invention. Next, the client PC 103 receives a ProbeMatch message from the DP server 102 (step S1803), and extracts from one or more <XAddrs> tags in the ProbeMatch message a URL of each of one or more DP servers on other subnets 2 and 3 (step S1804). The ProbeMatch message is an example of a second message in this invention, and steps S1801 to S1804 are an example of a first control step in this invention.

Next, the client PC 103 creates a Probe message having a <Types> tag in which a value representing a device/DP server type to be searched is set (step S1805), and transmits the Probe message by unicast to each of the one or more DP servers on other subnets (Step S1806). The Probe message is an example of a third message in this invention.

Next, the client PC 103 receives a ProbeMatch message from each of the one or more DP servers on other subnets (step S1807), and extracts a URL of each of one or more devices on other subnets from one or more <XAddrs> tags in the ProbeMatch message (step S1808). The ProbeMatch message is an example of a fourth message in this invention, and steps S1805 to S1808 are example of a second control step in this invention.

Next, the client PC 103 transmits a Get message by unicast to each of one or more devices on other subnets (step S1809), and receives a GetResponse message from each of the one or more devices on other subnets (step S1810), whereupon the present process is completed. The GetResponse message is an example of a reply message in this invention.

The client PC 103 can acquire device information about the one or more devices on other subnets by extracting the device information from the one or more GetResponse messages. Steps S1809 and S1810 and the acquisition of device information are an example of a third control step in this invention.

According to the above-described embodiment, the client PC can easily search for and find devices on different subnets in a network environment where a plurality of subnets are connected by routers.

Second Embodiment

Next, a description will be given of a second embodiment of this invention.

The WS-Discovery specification provided by Microsoft Corporation is configured that when receiving a Probe message by multicast from the client PC 103, the DP server 102 sends back a Hello message including a <Types> tag in which DiscoveryProxy is set. The second embodiment of this invention provides a method in which when receiving such a Hello message in response to a Probe message, the client PC 103 searches for and finds devices on other subnets.

In the following, a description will be given of how the client PC 103 searches for and finds the devices 104, 106 on other subnets 2, 3 using the DP server 102 on the subnet 1.

The client PC 103 transmits by multicast a Probe message such as that shown in FIG. 15, including a <Types> tag in which, e.g., printer is specified.

When receiving the Probe message, the DP server 102 determines whether the Probe message is a multicast and a value in the <Types> tag does not specify DP server, and if the answer to the determination is YES, performs a Hello message creation process. If the Probe message is a unicast or if the value in the <Types> tag specifies DP server (i.e., if the answer to the determination is NO), the DP server 102 performs a ProbeMatch message creation process as in the first embodiment.

In the Hello message creation process, the DP server 102 extracts from the Probe message a value in the <Types> tag representing device/DP server type, and searches pieces of device/DP server information in the holding unit 424 to find DP server information, using the extracted value as a search condition. Then the DP server 102 prepares Hello messages such as those shown in FIGS. 16A to 16C, each containing DP server information, and transmits the Hello messages to the client PC 103.

The Hello messages shown in FIGS. 16A to 16C each correspond to one search result. It should be noted that three pieces of DP server information can be included in one Hello message. The client PC 103 extracts from each of the one or more Hello messages a URL specified in the <XAddrs> tag, and performs the same device search process as that in the first embodiment.

Figure 17A:
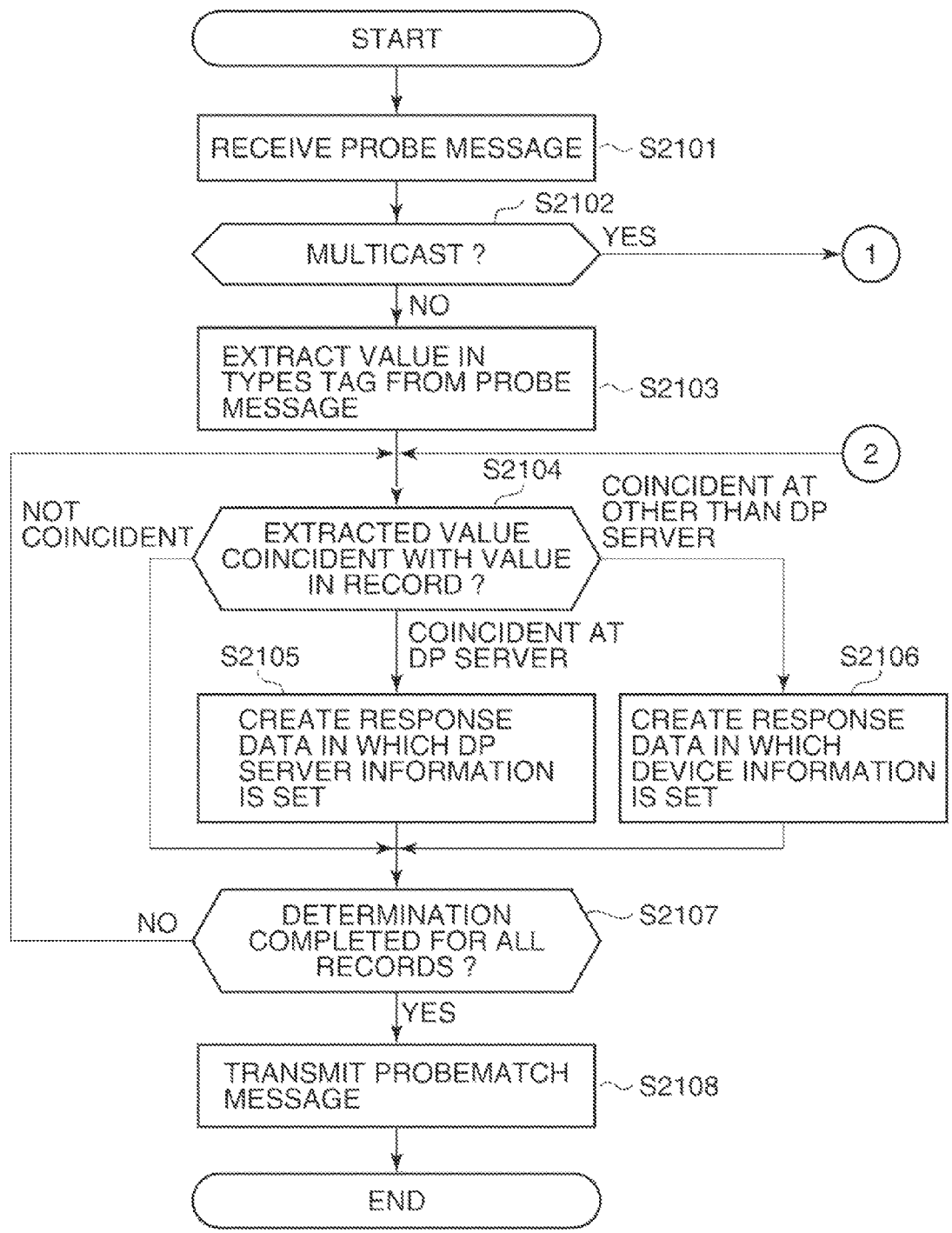
FIGS. 17A and 17B are a flowchart showing a process performed by the DP server at the device search in the second embodiment.
Figure 17B:
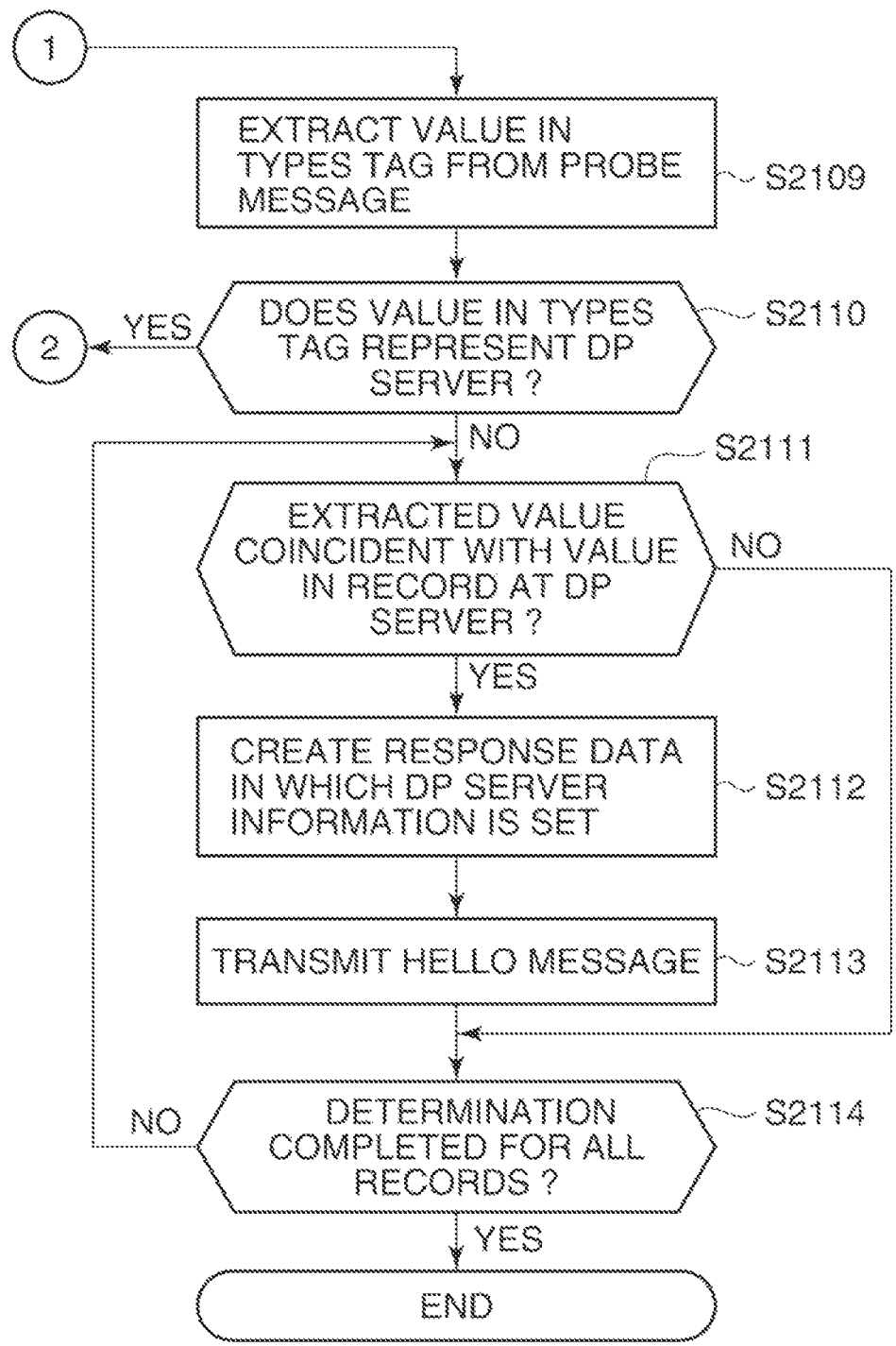

FIGS. 17A and 17B show in flowchart a process executed by the DP server 102 at the device search in the second embodiment.

The DP server 102 receives a Probe message (step S2101), and determines whether the Probe message is a multicast (step S2102). Step S2102 is an example of determination performed by a second determination unit in this invention. If it is determined in Step S2102 that the Probe message is not a multicast, the flow proceeds to step S2103.

In Step S2103, the DP server 102 extracts from the Probe message a value in the <Types> tag representing a device/DP server type. Next, the DP server 102 determines whether a value in the device type field 804 of a determination object record, which is selected from among records held in the information holding unit 424 of the DP server 102, coincides with the value extracted in Step S2103 in that they represent the same type of device/DP server (step S2104). If it is determined that both the extracted value and the value in the device type field 804 of the determination object record represent the same type of DP server (i.e., both the values are coincident with each other at DP server), the DP server 102 creates response data in which information representing such DP server is set (step S2105), and proceeds to Step S2107. On the other hand, if both the value extracted in Step S2103 and the value in the device type field 804 of the determination object record represent the same type of device (i.e., both the values are coincident with each other at other than DP server), the DP server 102 creates response data in which information representing such device is set (step S2106), and proceeds to Step S2107. If the value extracted in Step S2103 and the value in the device type field 804 of the determination object record do not coincide with each other, the flow proceeds from Step S2104 to Step S2107.

In step S2107, the DP server 102 determines whether the determination in Step S2104 has been completed for all the records held in the information holding unit 424. If the answer to Step S2107 is NO, the flow returns to step S2104 in which the next record is selected as determination object record and the device/DP server type is determined for the next record. On the other hand, if the answer to Step S2107 is YES, the flow proceeds to Step S2108 where the DP server 102 combines pieces of response data created until that time into one to thereby create a ProbeMatch message, and transmits the ProbeMatch message to the client PC 103, whereupon the present process is completed.

If it is determined in Step S2102 that the Probe message is a multicast, the flow proceeds to Step S2109 where the DP server 102 extracts a value in the <Types> tag from the Probe message. Next, the DP server 102 determines whether the extracted value represents DiscoveryProxy (step S2110). Step S2110 is an example of determination performed by a third determination unit in this invention. If it is determined in Step S2110 that the value represents DiscoveryProxy, the flow proceeds Step S2104.

On the other hand, if it is determined in Step S2110 that the value extracted in Step S2109 does not represent DiscoveryProxy, the flow proceeds to Step S2111 where the DP server 102 determines whether a value in the device type field 804 of a determination object record, which is selected from among records held in the information holding unit 424 of the DP server 102, coincides with the value extracted in Step S2109 in that they represent the same type of DP server. If the answer to Step S2111 is NO, the flow proceeds to Step S2114. On the other hand, if the answer to Step S2111 is YES, i.e., if it is determined that both the extracted value and the value in the device type field 804 of the determination object record represent the same type of DP server (i.e., are coincident with each other at DP server), the DP server 102 creates response data in which information representing such DP server is set (step S2112), and transmits the response data in the form of Hello message (step S2113). Next, in Step S2114, the DP server 102 determines whether the determination in Step S2111 has been completed for all the records held in the information holding unit 424. If the answer to Step S2114 is NO, the flow returns to Step S2111 in which the next record is selected as determination object record and the device/DP server type is determined for the next record. On the other hand, if the answer to Step S2114 is YES, the present process is completed.

Figure 18:
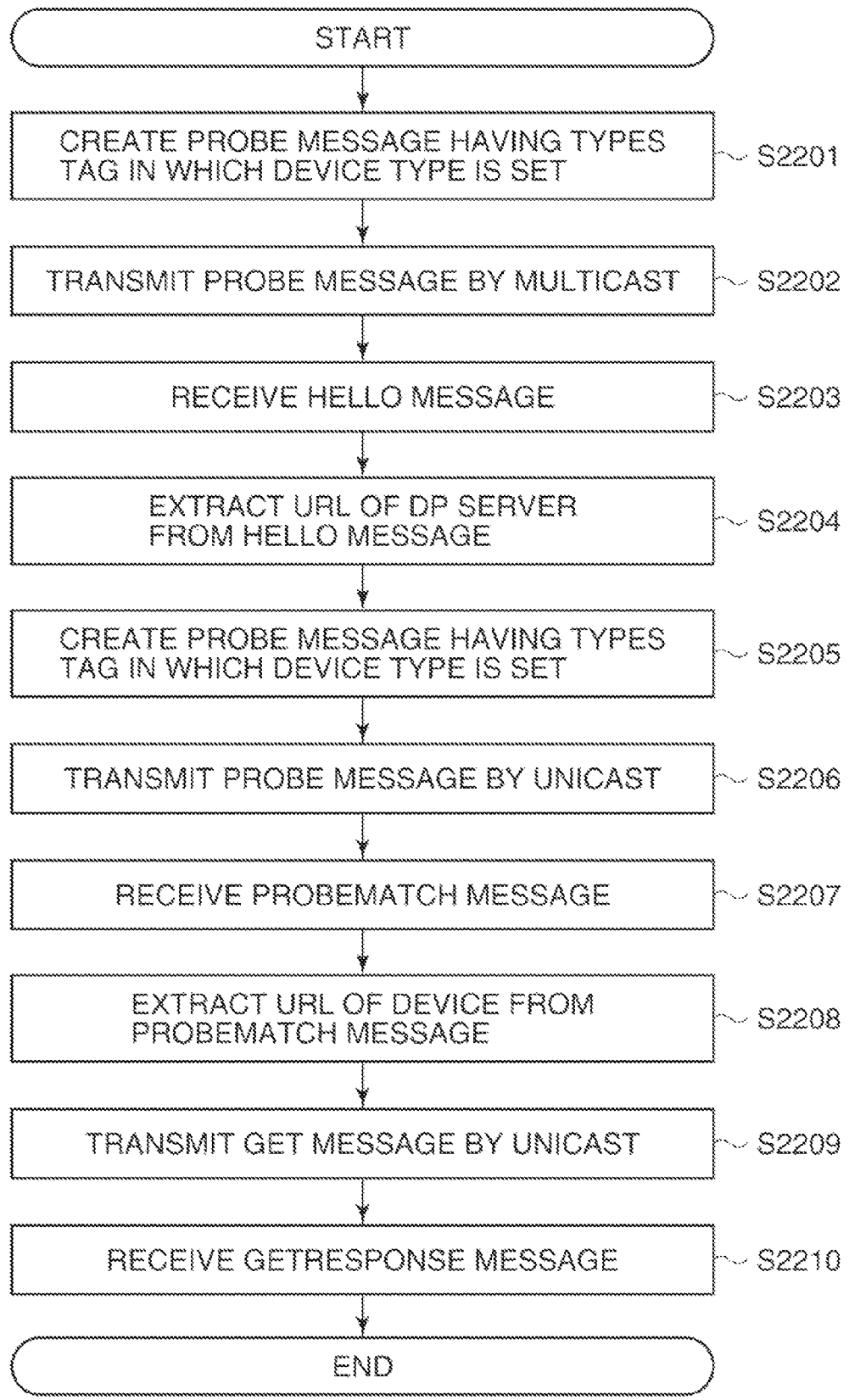
FIG. 18 is a flowchart showing a process performed by the client PC at the device search in the second embodiment.

FIG. 18 shows in flowchart a process executed by the client PC 103 at the device search in the second embodiment.

The client PC 103 creates a Probe message having a <Types> tag in which a value representing device type to be searched is set (step S2201), and transmits the Probe message by multicast (step S2202). Next, the client PC 103 receives one or more Hello messages from the DP server 102 (step S2203), and extracts a URL of each of one or more DP servers on other subnets from the <XAddrs> tag of each of the one or more Hello messages (step S2204).

Next, the client PC 103 creates a Probe message including a <Types> tag in which device/DP server type to be searched is set (step S2205), and transmits the Probe message by unicast to each of the one or more DP servers on other subnets (step S2206). Then, the client PC 103 receives a ProbeMatch message from each of the one or more DP servers on other subnets (step S2207), and extracts a URL of each of one or more devices on other subnets from the <XAddrs> tag of each of the one or more ProbeMatch messages (step S2208).

Next, the client PC 103 transmits Get message by unicast to each of the one or more devices on other subnets (step S2209), and receives a GetResponse message from each of the one or more devices on other subnets (step S2210), whereupon the present process is completed.

The client PC 103 is able to acquire device information about the one or more devices on other subnets from the one or more GetResponse messages.

According to the above-described embodiment, the client PC can easily search for and find devices on different subnets in a network environment where a plurality of subnets are connected by routers.

Third Embodiment

Next, a description will be given of a third embodiment of this invention.

In the first embodiment, the client PC 103 transmits a Probe message including a <Types> tag in which a value representing DP server is set, and receives a ProbeMatch sent back in reply to the Probe message. However, whether each piece of DP server information in the ProbeMatch message represents the DP server 102 on its own subnet 1 or represents the DP server 105 or 107 on another subnet 2 or 3 cannot be determined. Since information about the DP server on the own subnet can be acquired from a Hello message transmitted from the DP server 102 when the server 102 is connected to the subnet, it is enough for the client PC 103 to only acquire information about the DP servers on other subnets. Accordingly, in this embodiment, the client PC 103 transmits the Probe message for device search only to the DP servers 105, 107 on other subnets, while discriminating the DP server on the own subnet and the DP servers on other subnets.

In the following, a description will be given of how the client PC 103 searches for and finds, using the DP server 102, the devices 104, 106 on other subnets in the third embodiment.

The client PC 103 transmits by multicast a Probe message such as that shown in FIG. 11A. The Probe message shown in FIG. 11A includes a <Types> tag in which DiscoveryProxy is specified.

When receiving the Probe message, the DP server 102 extracts a value in the <Types> tag from the Probe message, and searches device/DP server information in the information holding unit 424 of the DP server 102 to find information representing DP server, using the extracted value as a search condition. Then, the DP server 102 transmits to the client PC 103 a ProbeMatch message including a search result such as that shown in FIG. 19. In the ProbeMatch message shown in FIG. 19, ProbeMatch parts 2301, 2302, and 2303 each surrounded by a <ProbeMatch> tag and a </ProbeMatch> tag and each corresponding to one search result are provided between a <ProbeMatches> tag and a </ProbeMatches> tag.

The DP server 102 specifies a value "Inside" in a <Subnet> tag of the corresponding ProbeMatch part, if the information about DP server searched and found from the device/DP server information in the information holding unit 424 represents the DP server on the own subnet. The DP server 102 specifies a value "Outside" in the <Subnet> tag, if the searched and found DP server information represents the DP server on another subnet. In the example shown in FIG. 19, the value "Inside" is specified in the <Subnet> tag of the ProbeMatch part 2301.

The client PC 103 determines URLs of the DP servers on other subnets based on URLs indicated in <XAddrs> tags and subnet information (Inside/Outside) indicated in the <Subnet> tags of the ProbeMatch message, and transmits a Probe message such as that shown in FIG. 12A to only the DP servers on other subnets. In other words, the Probe message is transmitted only to the DP servers 105, 107 represented by the ProbeMatch parts each having the <Subnet> tag in which the subnet information "Outside" is indicated.

It should be noted that the client PC 103 can perform control to display pieces of subnet information indicated in the <Subnet> tags on a UI screen to enable the user to select a desired DP server. Subsequently, the client PC 103 performs the same device search process as that in the first embodiment.

In the device search, the DP server 102 performs the same process as that in the first embodiment, and therefore a description thereof is omitted.

Figure 20A:
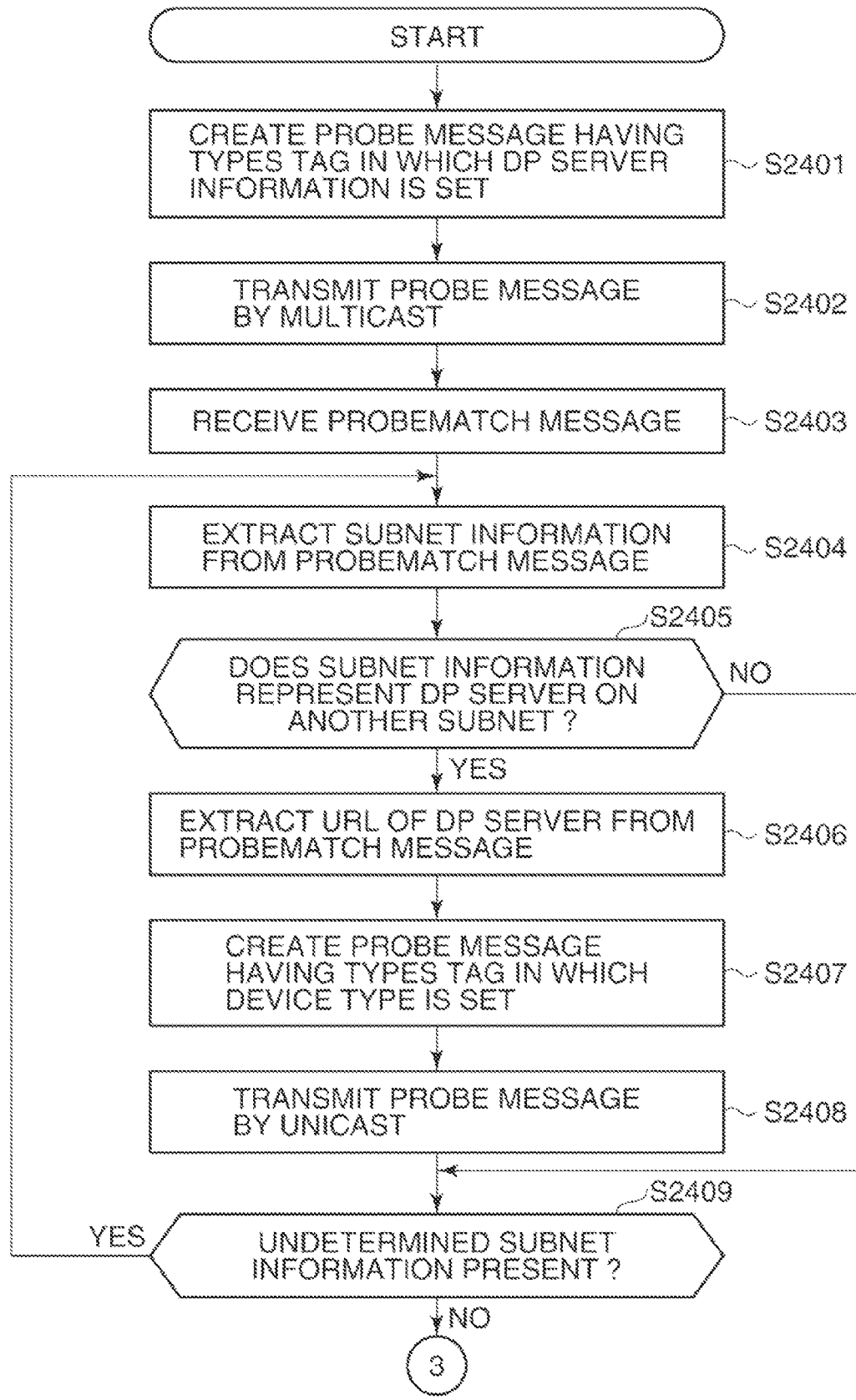

FIGS. 20A and 20B show in flowchart a process performed by the client PC 103 at the device search in the third embodiment.

First, the client PC 103 creates a Probe message having a <Types> tag in which a value representing DP server is set (step S2401), and transmits the Probe message by multicast (step S2402). Next, the client PC 103 receives a ProbeMatch message from the DP server 102 (step S2403).

The client PC 103 extracts subnet information indicated in one of one or more <Subnet> tags from the ProbeMatch message received from the DP server 102 (step S2404), and determines whether the extracted subnet information represents the DP server on another subnet (step S2405). If it is determined that the extracted subnet information represents the DP server on another subnet, the flow proceeds to Step S2406 where the client PC 103 extracts from the ProbeMatch message a URL of the DP server on another subnet indicated in a corresponding <XAddrs> tag.

Next, the client PC 103 creates a Probe message having a <Types> tag in which a value representing a device type to be searched is set (Step S2407), transmits the Probe message by unicast to the DP server on another subnet (step S2408), and proceeds to Step S2409. If it is determined in Step S2405 that the extracted subnet information represents the DP server 102 on the own subnet, the client PC 103 proceeds to Step S2409, without creating and transmitting a Probe message.

In step S2409, the client PC 103 determines whether an undetermined subnet information (i.e., an undetermined DP server information) remains in the ProbeMatch message, and if an undetermined DP server information remains in the message, returns to Step S2404. On the other hand, if it is determined in Step S2409 that no undetermined DP server information remains in the message, the flow proceeds to Step S2410.

In Step S2410, the client PC 103 receives a ProbeMatch message from each of one or more DP servers on other subnets. In Step S2411, the client PC 103 extracts a URL of the device on another subnet from the <XAddrs> tag of the ProbeMatch message.

Next, the client PC 103 transmits a Get message by unicast to each of one or more devices on other subnets (step S2412), and receives a GetResponse message therefrom (step S2413), whereupon the present process is completed.

The client PC 103 can acquire device information about the one or more devices on other subnets from one or more GetResponse messages.

It should be noted that in the third embodiment, whether DP server information searched and found from the pieces of device/DP server information in the DP server 102 represents the DP server on the own subnet or represents the DP server on another subnet is determined based on subnet information in the <Subnet> tag. Alternatively, such determination can be performed based on a value in the <Xaddrs> tag. Specifically, the client PC 103 extracts an IP address of the DP server from the <Xaddrs> tag, and determines whether the extracted IP address is included in an IP address range of the subnet to which the client PC 103 belongs. If the extracted IP address is included in the IP address range of the subnet to which the client PC 103 belongs, the searched and found DP server is determined as being the DP server on the own subnet. On the other hand, if the extracted IP address is not included in such IP address range, it is determined that the searched and found DP server is the DP server on another subnet.

Even in a case that the DP server 102 transmits a Hello message as in the second embodiment, whether DP server information searched and found from the device/DP server information in the DP server 102 represents the DP server on the own subnet or represents the DP server on another subnet can be determined based on subnet information in a <Subnet> tag additionally provided in the Hello message.

According to the above-described embodiment, the client PC can easily search for and find devices on different subnets in a network environment where a plurality of subnets are connected by routers.

Fourth Embodiment

Next, a description will be given of a fourth embodiment of this invention.

In the third embodiment, the client PC 103 is required to analyze tags and IP addresses in messages, which poses a problem that there is a fear that the processing load on the client PC 103 increases.

In the fourth embodiment, the way for the DP server 102 to respond to the Probe message is changed so as to reduce the processing load on the client PC 103.

Specifically, when receiving a Probe message having a <Types> tag in which a value representing DP server is set, the DP server 102 searches device/DP server information in the DP server 102 according to the value representing DP server in the Prove message. The DP server 102 sends back a search result in the form of Hello message, if searched and found information represents the DP server on the own subnet, and sends back a search result in the form of ProbeMatch message if the searched and found information represents the DP server on another subnet.

In the following, a description will be given of how the client PC 103 searches for and finds the devices 104, 106 on other subnets in the fourth embodiment, using the DP server 102.

The client PC 103 transmits by multicast a Probe message, such as that shown in FIG. 11A, including a <Types> tag in which DiscoveryProxy is specified. When receiving the Probe message, the DP server 102 extracts a value in the <Types> tag from the Probe message, and searches device/DP server information in the information holding unit 424 to find information representing DP server, using the extracted value as a search condition. Then, the DP server 102 transmits to the client PC 103 the DP server information in the form of Hello message such as that shown in FIG. 21A, if the found information is about the DP server on the own subnet, and transmits to the client PC 103 the DP server information in the form of ProbeMatch message such as that shown in FIG. 21B or 21C, if the found information is about the DP server on another subnet.

The client PC 103 determines whether the message received from the DP server 102 is a Hello message or a ProbeMatch message based on a value in the <Action> tag of the received message, and discards the received message if the message is a Hello message. On the other hand, if the received message is a ProbeMatch message, the client PC 103 extracts a URL in the <XAddrs> tag from the received message and transmits by unicast to the DP server on another subnet a Probe message such as that shown in FIG. 12A.

It should be noted that the client PC 103 can perform control to display a UI screen on which pieces of subnet information each representing whether the searched and found DP server is the DP server on the own subnet or on another subnet are displayed to enable the user to select a desired DP server. Subsequently, the client PC 103 performs the same device search process as that in the first embodiment.

Figure 22B:
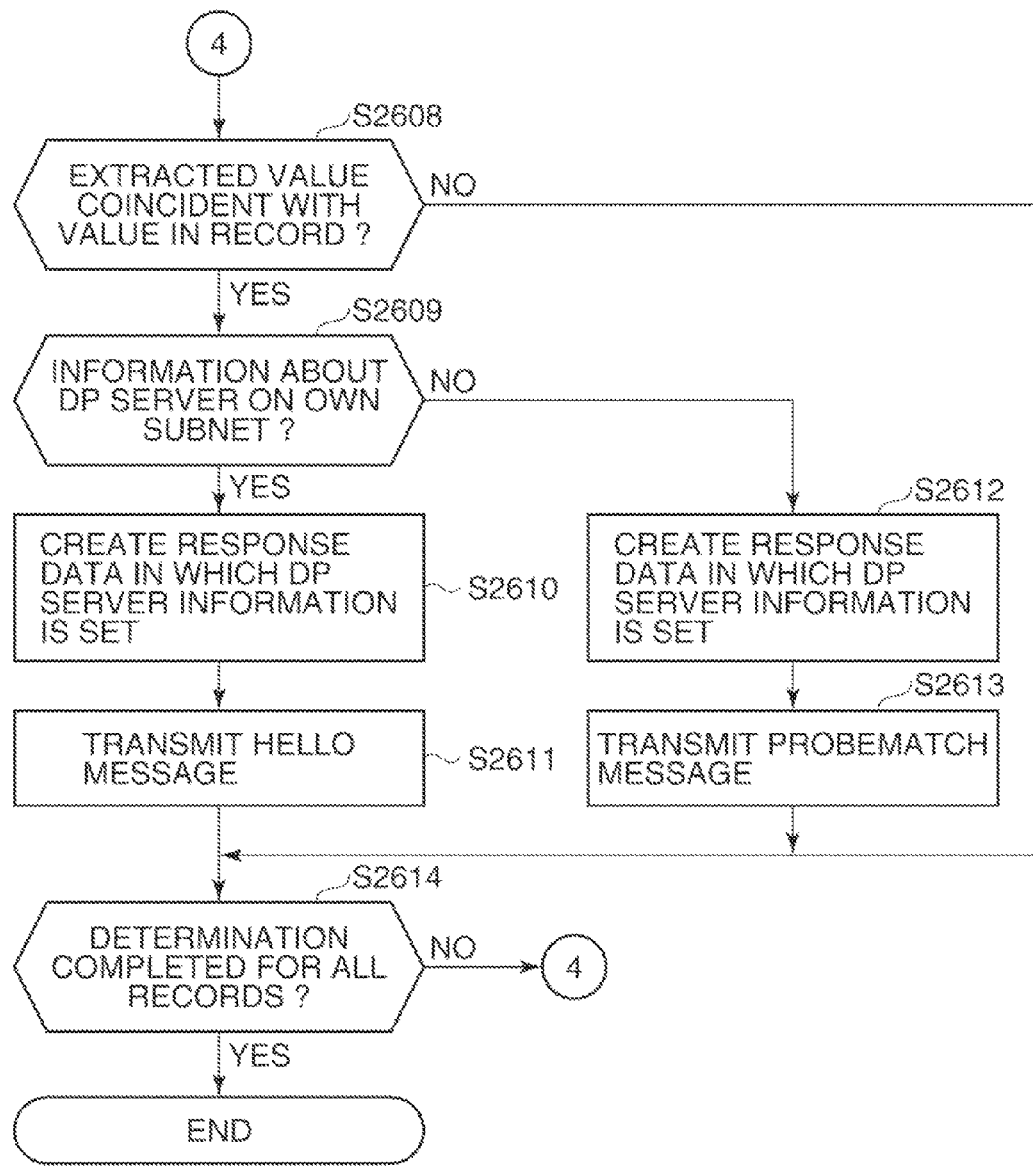

FIGS. 22A and 22B show in flowchart a process performed by the DP server 102 at the device search in the fourth embodiment.

The DP server 102 receives a Probe message (step S2601), extracts a value in the <Types> tag from the Probe message (step S2602), and determines whether the value in the <Types> tag is DiscoveryProxy (step S2603). Step S2603 is an example of determination by a fourth determination unit of this invention.

If it is determined in Step S2603 that the value in the <Types> tag is not DiscoveryProxy, the flow proceeds to Step S2604 where the DP server 102 determines whether a value in the device type field 804 of a determination object record, which is selected from among records held in the information holding unit 424 of the DP server 102, coincides with the value extracted in Step S2602 in that they represent the same type of device. If it is determined that both the extracted value and the value in the device type field 804 of the determination object record represent the same type of device, the DP server 102 creates response data in which information representing such device is set (step S2605). Next, in Step S2606, the DP server 102 determines whether the determination in Step S2604 has been completed for all the records held in the information holding unit 424. If the answer to Step S2606 is NO, the flow returns to Step S2604 in which the next record is selected as determination object record and the device type is determined for the next record. On the other hand, if the answer to Step S2606 is YES, the flow proceeds to step S2607 where the DP server 102 combines pieces of response data created until that time into one to create a ProbeMatch message, and transmits the ProbeMatch message to the client PC 103, whereupon the present process is completed.

On the other hand, if it is determined in Step S2603 that the value in the <Types> tag of the received Probe message is DiscoveryProxy, the DP server 102 determines whether the value in the device type field 804 of the determination object record coincides with the value extracted in Step S2602 in that they represent the same type of DP server (step S2608). If it is determined that both the extracted value and the value in the device type field 804 of the determination object record represent the same type of DP server, the DP server 102 determines whether the value extracted in Step S2602 from the Probe message represents the DP server on the own subnet (step S2609). Step S2609 is an example of determination by a fifth determination unit of this invention. If it is determined in Step S2609 that the extracted value represents the DP server on the own subnet, the DP server 102 creates response data (second response data) in which corresponding DP server information is set (step S2610), and transmits the response data in the form of Hello message to the client PC 103 (step S2611).

On the other hand, if it is determined in Step S2609 that the extracted value represents the DP server on another subnet, the DP server 102 creates response data (first response data) in which corresponding DP server information is set (step S2612), and transmits the response data in the form of Probe-Match message to the client PC 103 (step S2613).

In step S2614, the DP server 102 determines whether the determination in Step S2608 has been completed for all the records held in the information holding unit 424. If the answer to Step S2614 is NO, the flow returns to step S2608 in which the next record is selected as determination object record and the DP server type is determined for the next record. On the other hand, if the answer to Step S2614 is YES, the present process is completed.

Figure 23A:
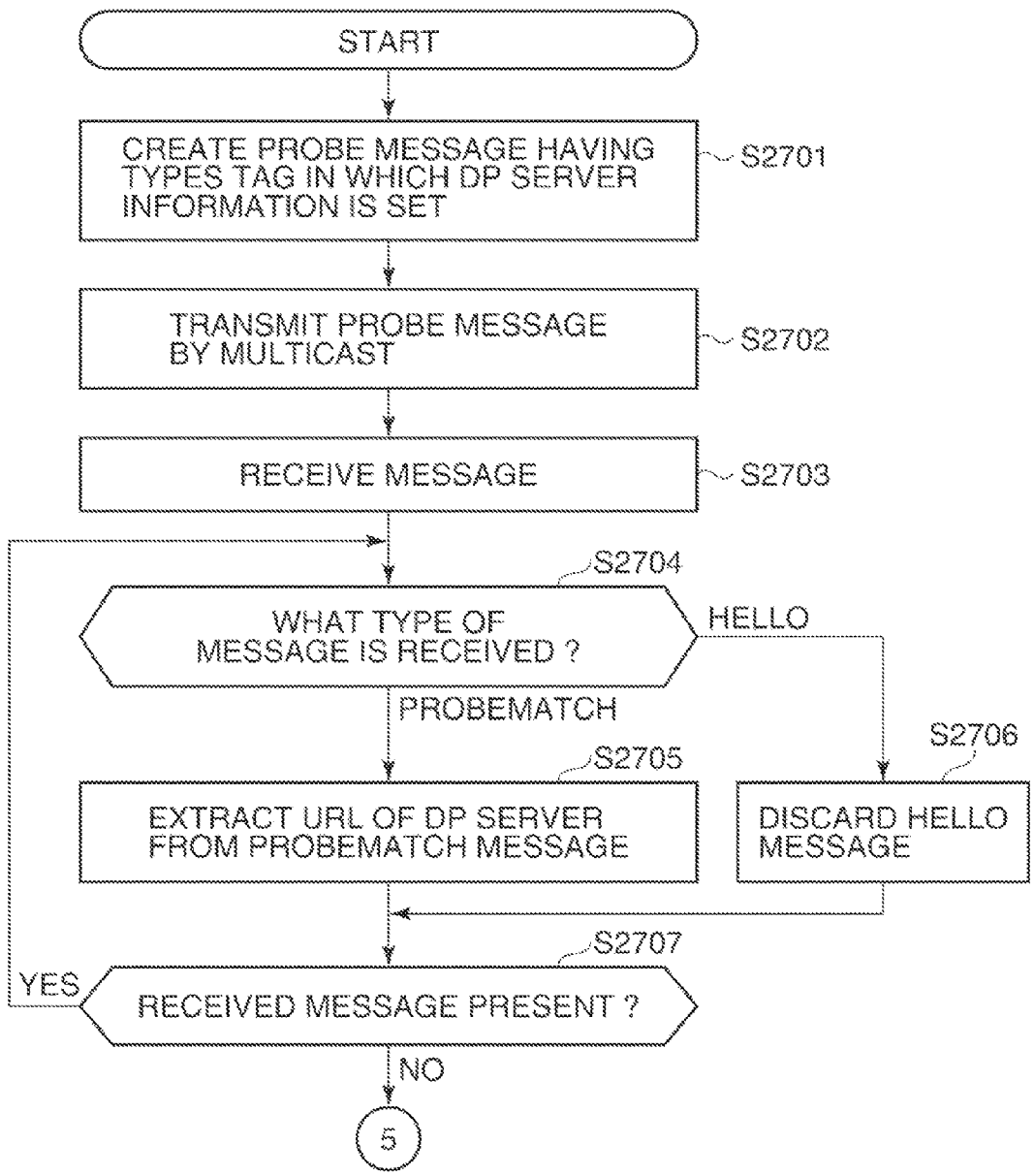
FIGS. 23A and 23B are a flowchart showing a process performed by the client PC at the device search in the fourth embodiment.
Figure 23B:
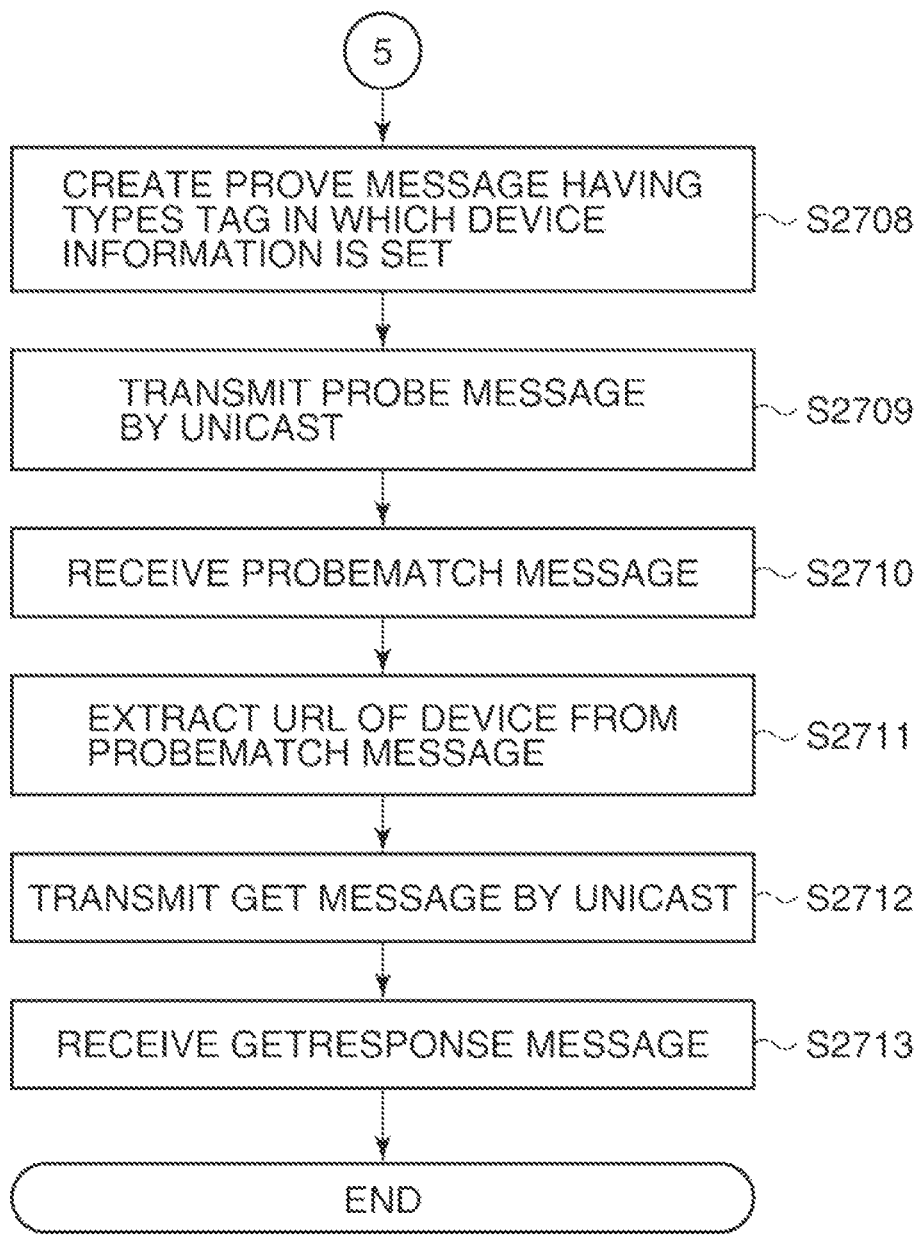

FIGS. 23A and 23B show in flowchart a process performed by the client PC 103 at the device search in the fourth embodiment.

The client PC 103 creates a Probe message including a <Types> tag in which a value representing DP server is set (step S2701), and transmits the Probe message by multicast to the DP server 102 (step S2702).

Next, the client PC 103 receives one or more messages from DP server 102 (step S2703), and determines a message type from a value in the <Action> tag of one of the one or more received messages (step S2704). If it is determined in Step S2704 that the message type is ProbeMatch, the flow proceeds to Step S2705 where the client PC 103 extracts a URL of the DP server on another subnet from the <XAddrs> tag of the received message (ProbeMatch message). On the other hand, if it is determined in Step S2704 that the message type is Hello, the flow proceeds to Step S2706 where the client PC 103 discards the received message (Hello message).

If it is determined in Step S2707 that there remains one or more unprocessed received messages, the flow returns to Step S2704. If it is determined that all of the one or more received messages have been processed, the flow proceeds to Step S2708 where the client PC 103 creates a Probe message having a <Types> tag in which a value representing device type to be searched for is set. Then, the client PC 103 transmits the Probe message by unicast to the DP server on another subnet (step S2709).

Next, the client PC 103 receives a ProbeMatch message from the DP server on another subnet (step S2710), and extracts a URL of each of one or more devices on other subnets from one or more <XAddrs> tags in the ProbeMatch message (step S2711). Next, the client PC 103 transmits a Get message by unicast to each of the one or more devices on other subnets (step S2712), and receives a GetResponse message from each of the one or more devices on other subnets (step S2713).

The client PC 103 can acquire device information about the one or more devices on other subnets by extracting the device information from the one or more GetResponse messages.

According to the above-described embodiment, the client PC can easily search for and find devices on different subnets in a network environment where a plurality of subnets are connected by routers.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-001155, filed Jan. 6, 2010, which is hereby incorporated by reference herein in its entirety.

What is claimed is:
1. A device search server connectable to a network including a plurality of subnets, the device search server on a first subnet of the plurality of subnets and configured to receive a request for device search from a device search apparatus connected to the network and transmit, as a search result, device information held in the device search server to the device search apparatus, the device search server comprising:
- a holding unit configured to hold pieces of information about respective ones of a plurality of devices and a plurality of device search servers on the plurality of subnets;
- a first determination unit configured to determine whether a device/server type of each of the pieces of information held in said holding unit coincides with a device/server type represented by the request for device search received from the device search apparatus on a second subnet of the plurality of subnets different than the first subnet;
- a creation unit configured to create response data according to a result of determination by said first determination unit;
- a transmission unit configured to transmit, as the search result, the created response data to the device search apparatus;
- a second determination unit configured to determine whether the received request for device search is a multicast; and
- a third determination unit configured to determine whether DiscoveryProxy is specified in the request for device search in a case where it is determined by said second determination unit that the request for device search is multicast,
- wherein said creation unit is configured to create response data based on the pieces of information held in said holding unit in a case where it is determined by said third determination unit that DiscoveryProxy is not specified in the request for device search, and
- wherein said transmission unit transmits the created response data as a Hello message.

2. The device search server according to claim 1, wherein said creation unit is configured, in a case where it is determined by said first determination unit that the device/server type represented by the request for device search is device search server, to include a setting of information about at least one of the plurality of device search servers in the response data, and is configured to include a setting of device information in the response data in a case where it is determined by said first determination unit that the device/server type represented by the request for device search is other than device search server, and
said transmission unit is configured to transmit the created response data as a ProbeMatch message.

3. A device search server connectable to a network including a plurality of subnets, the device search server on a first subnet of the plurality of subnets and configured to receive a request for device search from a device search apparatus connected to the network and transmit, as a search result, device information held in the device search server to the device search apparatus, the device search server comprising:
- a holding unit configured to hold pieces of information about respective ones of a plurality of devices and a plurality of device search servers on the plurality of subnets;
- a first determination unit configured to determine whether a device/server type of each of the pieces of information held in said holding unit coincides with a device/server type represented by the request for device search received from the device search apparatus on a second subnet of the plurality of subnets different than the first subnet;
- a creation unit configured to create response data according to a result of determination by said first determination unit; and
- a transmission unit configured to transmit, as the search result, the created response data to the device search apparatus,
wherein the first subnet is the device search server's own subnet, and wherein the device search server further includes:
- a second determination unit configured to determine whether DiscoveryProxy is specified in the received request for device search; and
- a third determination unit configured to determine whether information about the device search server on the device search server's own subnet is specified in the request for device search in a case where it is determined by said second determination unit that DiscoveryProxy is specified in the request for device search,
wherein said creation unit is configured, in a case where it is determined by said third determination unit that information about a different device search server on another subnet of the plurality of subnets that is different than the first subnet is specified in the request for device search, to create first response data based on the information about the different device search server on the other subnet, and configured to create second response data based on the information about the device search server on the device search server's own subnet in a case where it is determined by said third determination unit that the information about the device search server on the device search server's own subnet is specified in the request for device search, and
wherein said transmission unit is configured to transmit the created first response data as a ProbeMatch message, and is configured to transmit the created second response data as a Hello message.

4. A device search system comprising:
a device search apparatus connectable to a network including a plurality of subnets, the device search apparatus being on a first subnet of the plurality of subnets and configured to request at least one of a plurality of device search servers on the plurality of subnets to perform a device search and to receive device information sent back as a search result, the device search apparatus comprising:
- a first control unit configured to transmit, by multicast, a first message in which information representing a device search server or a device is set, and configured to extract, from a second message received from at least a device search server on a second subnet of the plurality of subnets that is different than the first subnet, a URL of the device search server on the second subnet;
- a second control unit configured to transmit, by unicast, a third message, in which a device type to be searched is set, to the device search server on the second subnet based on the URL extracted from the second message, and configured to extract a URL of a device on the second subnet from a fourth message received from the device search server on the second subnet; and
- a third control unit configured to acquire device information from a reply message sent back from the device on the second subnet based on the URL extracted from the fourth message, the device search system further comprising:
a device search server connectable to the network including the plurality of subnets and configured to receive a request for device search from the device search apparatus connected to the network and transmit, as a search result, device information held in the device search server to the device search apparatus, the device search server comprising:
- a holding unit configured to hold pieces of information about respective ones of a plurality of devices and at least some of the plurality of device search servers on the plurality of subnets;
- a first determination unit configured to determine whether a device/server type of each of the pieces of information held in said holding unit coincides with a device/server type represented by the request for device search received from the device search apparatus;
- a creation unit configured to create response data according to a result of determination by said first determination unit;
- a transmission unit configured to transmit, as the search result, the created response data to the device search apparatus;
- a second determination unit configured to determine whether the received request for device search is a multicast; and
- a third determination unit configured to determine whether DiscoveryProxy is specified in the request for device search in a case where it is determined by said second determination unit that the request for device search is multicast,
- wherein said creation unit is configured to create response data based on the pieces of information held in said holding unit in a case where it is determined by said third determination unit that DiscoveryProxy is not specified in the request for device search, and
- wherein said transmission unit transmits the created response data as a Hello message.

5. A device search method for a device search server connectable to a network including a plurality of subnets, the device search server on a first subnet of the plurality of subnets and configured to receive a request for device search from a device search apparatus connected to the network and transmit, as a search result, device information held in the device search server to the device search apparatus, the method comprising:
- a first determination step of determining whether a device/server type of each of pieces of information, which are held in a holding unit, about respective ones of a plurality of devices and a plurality of device search servers on the plurality of subnets coincides with a device/server type represented by the request for device search received from the device search apparatus on a second subnet of the plurality of subnets different than the first subnet;
- a creation step of creating response data according to a result of determination in said first determination step;
- a transmission step of transmitting, as the search result, the created response data to the device search apparatus;
- a second determination step of determining whether the received request for device search is a multicast; and
- a third determination step of determining whether DiscoveryProxy is specified in the request for device search in a case where it is determined in said second determination step that the request for device search is multicast,
- wherein said creation step includes creating response data based on the pieces of information held in said holding unit in a case where it is determined in said third determination step that DiscoveryProxy is not specified in the request for device search, and
- wherein said transmission step includes transmitting the created response data as a Hello message.

6. A non-transitory computer-readable storage medium storing a computer-executable program for a device search server connectable to a network including a plurality of subnets, the device search server on a first subnet of the plurality of subnets and configured to receive a request for device search from a device search apparatus connected to the network and transmit, as a search result, device information held in the device search server to the device search apparatus, the program comprising:
- holding instructions configured to hold pieces of information, in a holding unit, about respective ones of a plurality of devices and a plurality of device search servers on the plurality of subnets;
- first determination instructions configured to determine whether a device/server type of each of the pieces of information held according to said holding instructions coincides with a device/server type represented by the request for device search received from the device search apparatus on a second subnet of the plurality of subnets different than the first subnet;
- creation instructions configured to create response data according to a result of determination according to said first determination instructions;
- transmission instructions configured to transmit, as the search result, the created response data to the device search apparatus,
- second determination instructions configured to determine whether the received request for device search is a multicast; and
- third determination instructions configured to determine whether DiscoveryProxy is specified in the request for device search in a case where it is determined according to said second determination instructions that the request for device search is multicast,
- wherein said creation instructions are configured to create response data based on the pieces of information held in said holding unit in a case where it is determined according to said third determination instructions that DiscoveryProxy is not specified in the request for device search, and
- wherein said transmission instructions are configured to transmit the created response data as a Hello message.

7. A device search system comprising:
- a device search apparatus connectable to a network including a plurality of subnets, the device search apparatus being on a first subnet of the plurality of subnets and configured to request at least one of a plurality of device search servers on the plurality of subnets to perform a device search and to receive device information sent back as a search result, the device search apparatus comprising:
  - a first control unit configured to transmit, by multicast, a first message in which information representing a device search server or a device is set, and configured to extract, from a second message received from at least a device search server on a second subnet of the plurality of subnets that is different than the first subnet, a URL of the device search server on the second subnet;
  - a second control unit configured to transmit, by unicast, a third message, in which a device type to be searched is set, to the device search server on the second subnet based on the URL extracted from the second message, and configured to extract a URL of a device on the second subnet from a fourth message received from the device search server on the second subnet; and a third control unit configured to acquire device information from a reply message sent back from the device on the second subnet based on the URL extracted from the fourth message, the device search system further comprising:

a device search server connectable to the network including the plurality of subnets and configured to receive a request for device search from the device search apparatus connected to the network and transmit, as a search result, device information held in the device search server to the device search apparatus, wherein the first subnet is the device search server's own subnet, and the device search server comprises:

a holding unit configured to hold pieces of information about respective ones of a plurality of devices and at least some of the plurality of device search servers on the plurality of subnets;

a first determination unit configured to determine whether a device/server type of each of the pieces of information held in said holding unit coincides with a device/server type represented by the request for device search received from the device search apparatus;

a creation unit configured to create response data according to a result of determination by said first determination unit;

a transmission unit configured to transmit, as the search result, the created response data to the device search apparatus;

a second determination unit configured to determine whether DiscoveryProxy is specified in the received request for device search; and a third determination unit configured to determine whether information about the device search server on the device search server's own subnet is specified in the request for device search in a case where it is determined by said second determination unit that DiscoveryProxy is specified in the request for device search, wherein said creation unit is configured, in a case where it is determined by said third determination unit that information about a different device search server on another subnet of the plurality of subnets that is different than the first subnet is specified in the request for device search, to create first response data based on the information about the different device search server on the other subnet, and configured to create second response data based on the information about the device search server on the device search server's own subnet in a case where it is determined by said third determination unit that the information about the device search server on the device search server's own subnet is specified in the request for device search, and wherein said transmission unit is configured to transmit the created first response data as a ProbeMatch message, and is configured to transmit the created second response data as a Hello message.

8. A device search method for a device search server connectable to a network including a plurality of subnets, the device search server on a first subnet of the plurality of subnets and configured to receive a request for device search from a device search apparatus connected to the network and transmit, as a search result, device information held in the device search server to the device search apparatus, the method comprising:

a first determination step of determining whether a device/server type of each of pieces of information, which are held in a holding unit, about respective ones of a plurality of devices and a plurality of device search servers on the plurality of subnets coincides with a device/server type represented by the request for device search received from the device search apparatus on a second subnet of the plurality of subnets different than the first subnet;

a creation step of creating response data according to a result of determination in said first determination step; and a transmission step of transmitting, as the search result, the created response data to the device search apparatus, wherein the first subnet is the device search server's own subnet, and wherein the method further includes:

a second determination step of determining whether DiscoveryProxy is specified in the received request for device search; and a third determination step of determining whether information about the device search server on the device search server's own subnet is specified in the request for device search in a case where it is determined in said second determination step that DiscoveryProxy is specified in the request for device search, wherein said creation step includes, in a case where it is determined in said third determination step that information about a different device search server on another subnet of the plurality of subnets that is different than the first subnet is specified in the request for device search, creating first response data based on the information about the different device search server on the other subnet, and configured to create second response data based on the information about the device search server on the device search server's own subnet in a case where it is determined in said third determination step that the information about the device search server on the device search server's own subnet is specified in the request for device search, and wherein said transmission step includes transmitting the created first response data as a ProbeMatch message and transmitting the created second response data as a Hello message.

9. A non-transitory computer-readable storage medium storing a computer-executable program for a device search server connectable to a network including a plurality of subnets, the device search server on a first subnet of the plurality of subnets and configured to receive a request for device search from a device search apparatus connected to the network and transmit, as a search result, device information held in the device search server to the device search apparatus, the program comprising:

holding instructions configured to hold pieces of information, in a holding unit, about respective ones of a plurality of devices and a plurality of device search servers on the plurality of subnets;

first determination instructions configured to determine whether a device/server type of each of the pieces of information held according to said holding instructions coincides with a device/server type represented by the request for device search received from the device search apparatus on a second subnet of the plurality of subnets different than the first subnet;

creation instructions configured to create response data according to a result of determination according to said first determination instructions; and transmission instructions configured to transmit, as the search result, the created response data to the device search apparatus, wherein the first subnet is the device search server's own subnet, and wherein the program further includes:

second determination instructions configured to determine whether DiscoveryProxy is specified in the received request for device search; and third determination instructions configured to determine whether information about the device search server on the device search server's own subnet is specified in the request for device search in a case where it is determined according to said second determination instructions that DiscoveryProxy is specified in the request for device search, wherein said creation instructions are configured, in a case where it is determined according to said third determination instructions that information about a different device search server on another subnet of the plurality of subnets that is different than the first subnet is specified in the request for device search, to create first response data based on the information about the different device search server on the other subnet, and configured to create second response data based on the information about the device search server on the device search server's own subnet in a case where it is determined according to said third determination instructions that the information about the device search server on the device search server's own subnet is specified in the request for device search, and wherein said transmission instructions are configured to transmit the created first response data as a ProbeMatch message, and are configured to transmit the created second response data as a Hello message.

* * * * *